US008552843B2

(12) United States Patent
Dizechi et al.

(10) Patent No.: US 8,552,843 B2
(45) Date of Patent: Oct. 8, 2013

(54) UNIVERSAL REMOTE CONTROLLER HAVING HOME AUTOMATION FUNCTION

(75) Inventors: Manuchehr Dizechi, San Diego, CA (US); Leon W. Gateno, San Diego, CA (US)

(73) Assignee: SMK Manufacturing, Chula Vista, CA (US)

( * ) Notice: Subject to any disclaimer, the term of this patent is extended or adjusted under 35 U.S.C. 154(b) by 1092 days.

(21) Appl. No.: 12/029,723

(22) Filed: Feb. 12, 2008

(65) Prior Publication Data

US 2009/0202250 A1 Aug. 13, 2009

(51) Int. Cl.
*G05B 11/01* (2006.01)
*G08B 3/00* (2006.01)
*H04B 10/00* (2013.01)

(52) U.S. Cl.
USPC .................... 340/12.22; 340/12.5; 340/13.24; 340/691.1; 340/691.4; 398/106; 398/107; 398/111; 398/112

(58) Field of Classification Search
USPC ..................... 340/825.69, 12.22, 12.5, 13.24, 340/691.1–691.6; 398/106, 107, 111, 112
See application file for complete search history.

(56) References Cited

U.S. PATENT DOCUMENTS 5,500,794 A * 3/1996 Fujita et al. ..................... 700/83
5,909,183 A * 6/1999 Borgstahl et al. .......... 340/12.29
6,400,968 B1 * 6/2002 White et al. .................. 455/572
6,407,779 B1 * 6/2002 Herz ............................ 348/734
6,587,739 B1 * 7/2003 Abrams et al. .................. 700/83
6,970,751 B2 11/2005 Gonzales et al.
6,980,080 B2 12/2005 Christensen et al.
7,274,303 B2 * 9/2007 Dresti et al. ................. 340/12.3
7,755,506 B1 * 7/2010 Clegg et al. .................. 340/12.3
8,125,318 B2 * 2/2012 Heimbrock et al. ....... 340/12.22
2002/0065099 A1 * 5/2002 Bjorndahl ..................... 455/553
2002/0070873 A1 * 6/2002 Davies et al. ............ 340/825.22
2003/0040813 A1 2/2003 Gonzales et al.
2003/0074088 A1 4/2003 Gonzales et al.
2004/0036624 A1 * 2/2004 Ballew et al. ............ 340/825.69
2004/0266419 A1 * 12/2004 Arling et al. .................. 455/420
2005/0085930 A1 4/2005 Gonzales et al.
2006/0020353 A1 1/2006 Gonzales et al.
2007/0052549 A1 * 3/2007 Le ........................... 340/825.72

FOREIGN PATENT DOCUMENTS

WO WO 2006008528 A1 * 1/2006

* cited by examiner

*Primary Examiner* — Daniel Wu
*Assistant Examiner* — Kam Ma
(74) *Attorney, Agent, or Firm* — Westerman, Hattori, Daniels & Adrian, LLP

(57) ABSTRACT

A universal remote controller having a radio frequency (RF) control mode for generating RF signals for controlling an RF based home automation system and having an infrared (IR) control mode for controlling an infrared based electronic device using IR control signals. Control information input via a user interface is used to generate the IR control signals in the IR mode of operation and is used to generate the RF signals in the RF mode of operation. A control unit controls overall operation of the universal remote controller including the generation of IR signals to control electronic devices with the IR signals. A home automation module is connected to the control unit via a communication interface to generate RF signals to control the RF based home automation system. A display displays feedback information to the user regarding operations for controlling the home automation system.

15 Claims, 14 Drawing Sheets

UNIVERSAL REMOTE CONTROLLER HAVING HOME AUTOMATION FUNCTION

TECHNICAL FIELD

The present invention relates to a universal remote controller having a plurality of control modes for controlling different types of electronic devices. More specifically, the present invention relates to a universal remote controller for controlling different types of electronic devices, including devices operating under infrared (IR) control and wireless home automation system devices operating under radio frequency (RF) control.

BACKGROUND OF THE INVENTION

Home automation and control systems are used to control the behavior of an environment, such as a home or workplace. Home automation systems may be used to control functions of various devices in a home automation network, such as lights, blinds, drapes, thermostats, etc. A remote controller may serve as a user interface to the home automation system to control devices of the home automation system. The remote controller may control functions, such as setting up a home automation network, programming device nodes in the home automation network, and controlling device nodes that have already been programmed in the network.

However, the operations of setting up a home automation network, programming various device nodes and controlling the device nodes can be complicated and difficult for a user to perform. Therefore, it is important that a remote controller for the home automation network provide a user interface that is easy to use and provides visual feedback to a user to ensure that the various control functions are properly performed.

Furthermore, a so-called "universal remote controller" can control a plurality of different devices with the same remote controller. The universal remote controller provides user convenience in that multiple remote controllers are not required to control different devices. However, a universal remote controller that controls a plurality of devices or systems can become complicated to operate.

SUMMARY OF THE INVENTION

The present invention provides a universal remote controller having a radio frequency (RF) control mode for generating RF signals for controlling a radio frequency based home automation system and having an infrared (IR) control mode for controlling an infrared based electronic device using infrared (IR) control signals, the universal remote controller including a control unit to control operation of the universal remote controller; an IR circuit to generate IR signals in response to commands from the control unit to control electronic devices using the IR control signals; a home automation module connected to control unit via a communication interface to generate RF signals to control a home automation system, the control unit and the home automation module exchanging information via the communication interface; a user interface to input control information to the control unit, the control information being used to generate the IR control signals in an IR mode of operation and being used to generate the RF signals in an F mode of operation; and a display to display feedback information to the user regarding operations for controlling the home automation system.

BRIEF DESCRIPTION OF THE DRAWINGS

The advantages of the invention will become apparent in the following description taken in conjunction with the drawings, wherein.

DETAILED DESCRIPTION OF THE INVENTION

Figure 1:
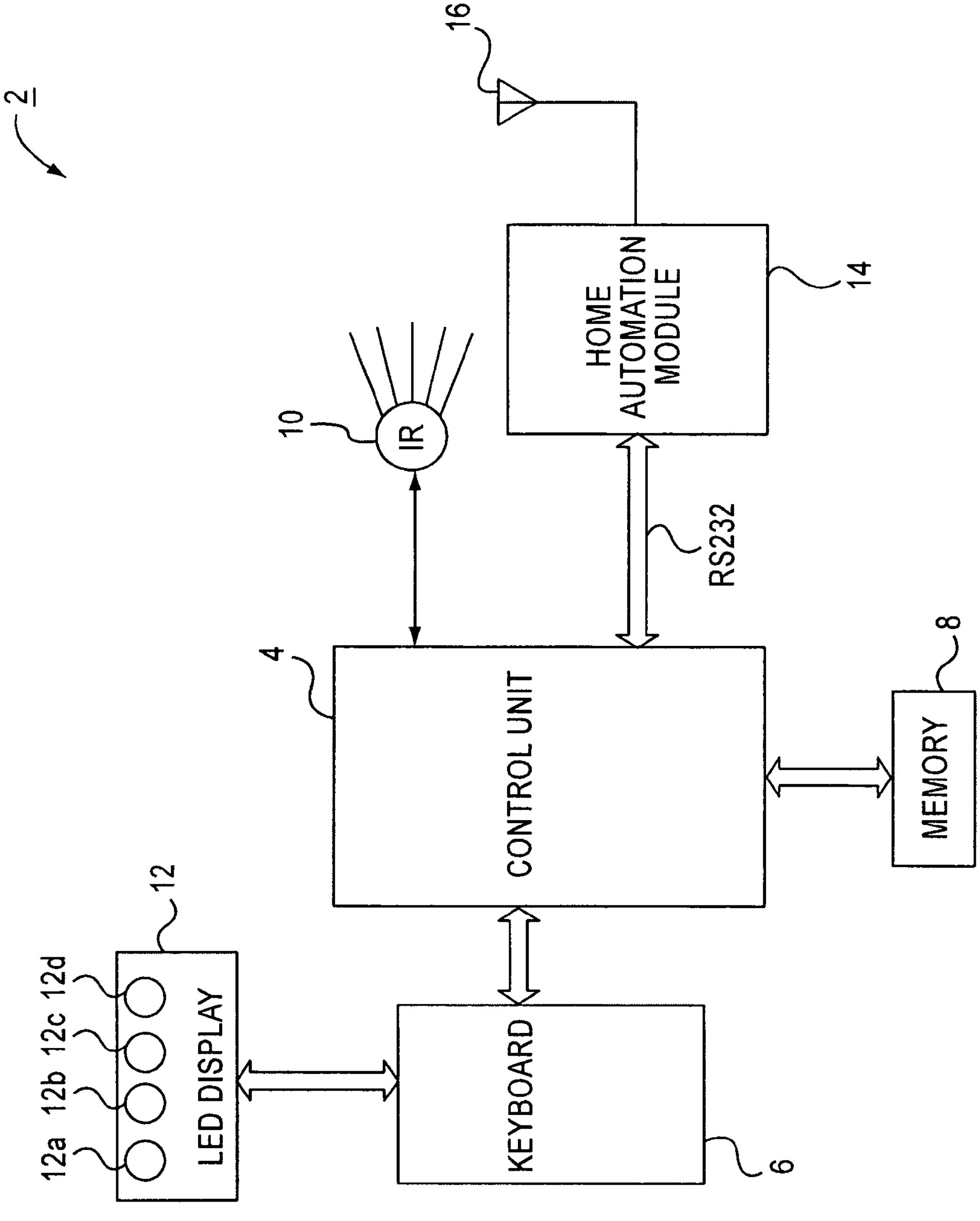
FIG. 1 is a block diagram of circuitry comprising the universal remote controller in accordance with embodiments of the present invention.

Reference will now be made in detail to preferred embodiments of the present invention, examples of which are illustrated in the accompanying drawings, wherein like reference numerals refer to like elements throughout.

FIG. 1 is a block diagram illustrating circuitry comprising a universal remote controller 2 in accordance with embodiments of the present invention. As will be described in detail below, the universal remote controller 2 includes an infrared (IR) control mode and a radio frequency (RF) control mode (also referred to herein as a home automation control mode). The IR control mode is used to access and control various electronic devices, such as a cable box/satellite terminal, a television (TV), and a video (DVD, VCR) or audio system, using IR control signals. The RF control mode is used to access and control electronic devices of a wireless home automation system using radio frequency control signals.

As shown in the block diagram of FIG. 1, the universal remote controller 2 includes a control unit 4 electrically connected to a keyboard 6, a memory 8, an IR circuit 10, a light-emitting diode (LED) display 12 and a home automation module 14. Each of the control unit 4, keyboard 6, memory 8, IR circuit 10, LED display 12 and home automation module 14 may be mounted on a motherboard including a power supply. The home automation module 14 is connected to and communicates with the control unit 4 via an RS232 interface. The home automation module 14 also includes an antenna 16 to transmit radio frequency (RF) commands to and receive RF commands from an electronic home automation device (also referred to herein equivalently as a "node") that is preferably part of a home automation network including a plurality of home automation devices (nodes). The antenna 16 is a preferably a ¼ wave printed antenna. The memory 8 is illustrated as a single block for illustration purposes. The memory 8 may include any of or all of read-only memory (ROM), electrically erasable programmable read-only memory (EEPROM), and random access memory (RAM).

In accordance with preferred embodiments of the present invention, the home automation network is preferably a Z-WAVE network and the home automation devices are nodes in the Z-WAVE network. The Z-WAVE network and nodes conform to the Z-WAVE standard for wireless home control products, which is an interoperable wireless communication protocol developed by the Z-WAVE Alliance. According to the Z-WAVE standard, the home automation module 14 is part of the Z-WAVE network and is referred to as a node in the network.

Of course, it will be recognized that the universal remote controller 2 of the present invention is also applicable to other types of home automation networks in which commands and information are communicated between the universal remote controller 2 and the home automation devices by RF signals. For example, the universal remote controller 2 is applicable to networks, such as BLUETOOTH and WiFi.

The control unit 4 is preferably a microprocessor that controls the overall operation of the universal remote controller 2. The memory 8 of the control unit 4 stores algorithms to control the IR circuit 10 to generate IR commands and includes algorithms for controlling the home automation module 14 to generate radio frequency (RF) commands. The algorithms may be stored in the ROM of memory 8 and the algorithms utilize the EEPROM of memory 8 to store constants and the RAM of memory 8 as a scratch pad. Algorithms for controlling the home automation module 14 to generate radio frequency (RF) commands are primarily stored in a ROM of the home automation module 14. These algorithms for controlling the home automation module 14 to generate radio frequency (RF) commands are known algorithms corresponding to an open standard, such as Z-WAVE. However, these algorithms may correspond to other networking standards, such as BLUETOOTH or WiFi. The control unit 4 sends commands, such as transmit a packet, turn on a receiver and create a packet, to the home automation module 14 via the RS232 interface to control the home automation module 14. Furthermore, when the universal remote controller 2 is in the RF control mode, the control unit 4 performs operations of translating a keystroke entered on the keyboard 6 to an RF command, such as a Z-WAVE command and sends the command to the home automation module 14 via the RS232C interface.

The IR circuit 10 may be a conventional type of IR circuit having IR hardware and an LED that generates light waves having a specific wavelength designed to work with an IR receiver.

The LED display 12 includes at least four LEDs 12*a*, 12*b*, 12*c* and 12*d*. As will be described in greater detail hereinbelow, the LED display 12 is appropriately activated in conjunction with key inputs to the keyboard 4 to provide a user interface that assists the user in navigating through a home automation control mode of the universal remote controller 2. The LED display 12 provides the user with easy to understand visual feedback regarding the home automation control mode of operation.

Figure 2:
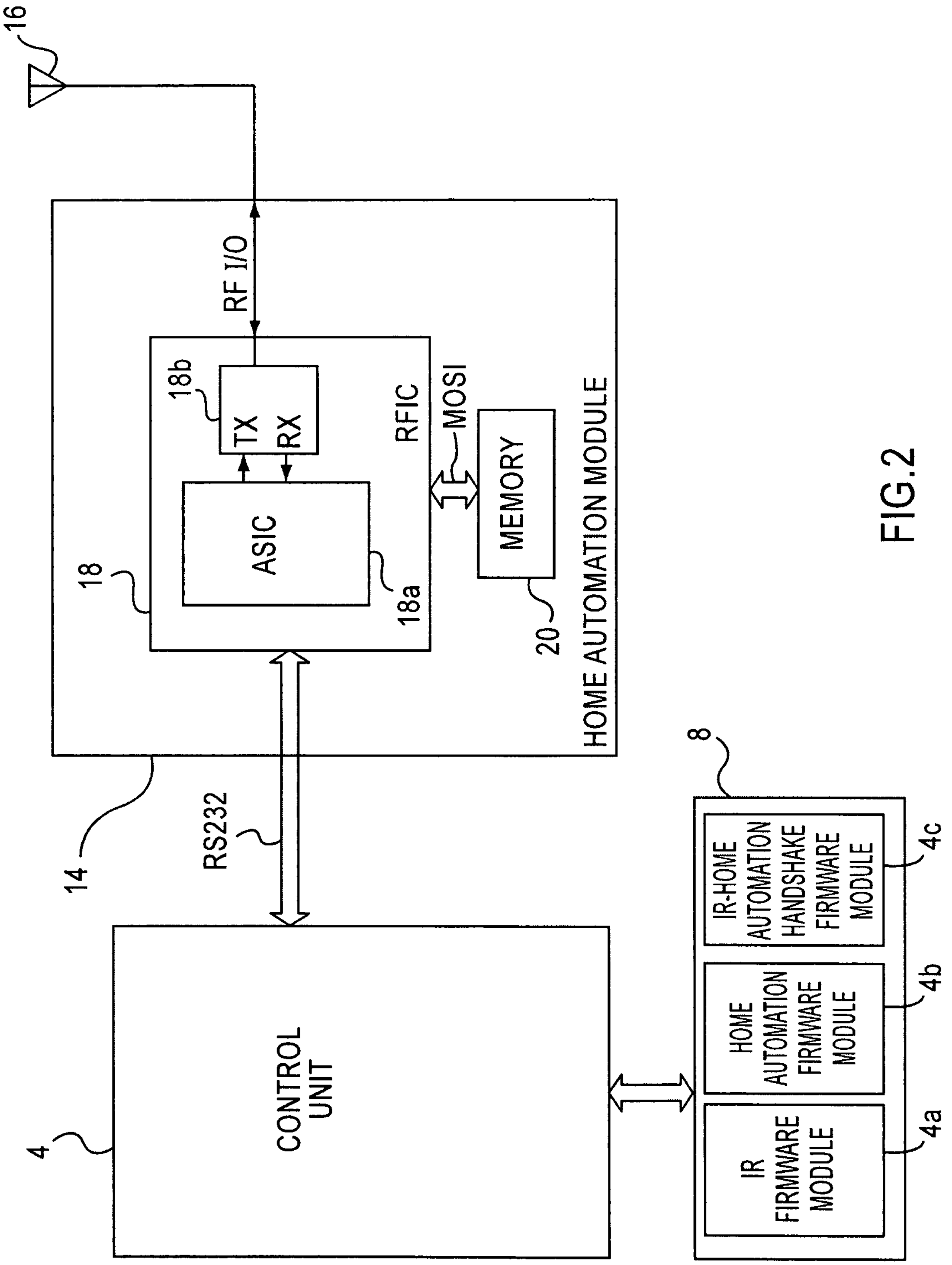
FIG. 2 is a block diagram illustrating a control unit and a home automation module of the universal remote controller in accordance with embodiments of the present invention.

FIG. 2 is a block diagram illustrating in more detail the control unit 4 and the home automation module 14 of the universal remote controller in accordance with embodiments of the present invention. As shown in FIG. 2, the control unit 4 includes an IR firmware module 4*a*, a home automation firmware module 4*b*, and an IR-home automation handshake firmware module 4*c*. The IR firmware module 4*a*, the home automation firmware module 4*b*, and the IR-home automation handshake firmware module 4*c* are preferable stored in the ROM of memory 8.

Furthermore, as shown in FIG. 2, the home automation module 14 includes a radio frequency integrated circuit (RFIC) 18, a memory 20, and the antenna 16. The RFIC 18 includes an application specific integrated circuit (ASIC) 18*a* and a transceiver 18*b*. The RFIC 18 communicates with the control unit 4 via the RS 232 interface. The transceiver 18*b* sends RF signals to and receives RF signals from nodes of a home automation network via the antenna 16. The memory 20 preferably includes read-only memory (ROM) that stores home automation information and algorithms for controlling the home automation module 14 to generate radio frequency (RF) commands. The memory 20 is connected to the RFIC 18 via a microprocessor operating system interface (MOSI)

The IR firmware module 4*a* is used to control functions of the universal remote controller 2 when the universal remote controller 2 is communicating with a product that has IR capabilities, such as a TV, VCR, DVD player/recorder, and cable/satellite boxes. The IR firmware module 4*a* includes an extensive database of different brands of devices, such as TVs, VCRs, DVD players/recorders, and cable/satellite boxes. The IR firmware module 4*a* may be a standard type of IR firmware module that controls the IR channel processes such as mode selection, code entry, function selection and volume punch through assignment.

The home automation firmware module 4*b* communicates with the RFIC 18 via the RS232 interface to control the home automation module 14. The home automation firmware module 4*b* sends commands, such as transmit a packet, turn on a receiver and create a packet, to the RFIC 18 via the RS232 interface. The purpose of the home automation module 14 is to control nodes in a home automation network, such as the Z-WAVE network. The different nodes in the home automation network have different purposes. For example, some of the nodes have the function of turning on and off, and can control a lighting system. Other nodes have a dimming function, and can be used to control dimming of lights or a dimming function of a motor. The dimming function of the motor controls the position of the motor, and can be used to control functions such as raising and lowering of a Venetian blind. Other nodes in the home automation network function to monitor and transmit information, such as temperature and time. The type of firmware in firmware module 4*b* will depend on the type of network being controlled, such as Z-WAVE, BLUETOOTH and WiFi.

The IR-home automation handshake firmware module 4*c* controls the exchange of information between the control unit 4 and the home automation module 14. For example, the home automation module 14 can send information to the control unit 4 to not allow the TV to be turned on, or, for example, the control unit 4 can send information to the home automation module 14 to lower the blinds when the TV is turned on. The IR-home automation handshake firmware module 4*c* will be described in more detail below.

Figure 3:
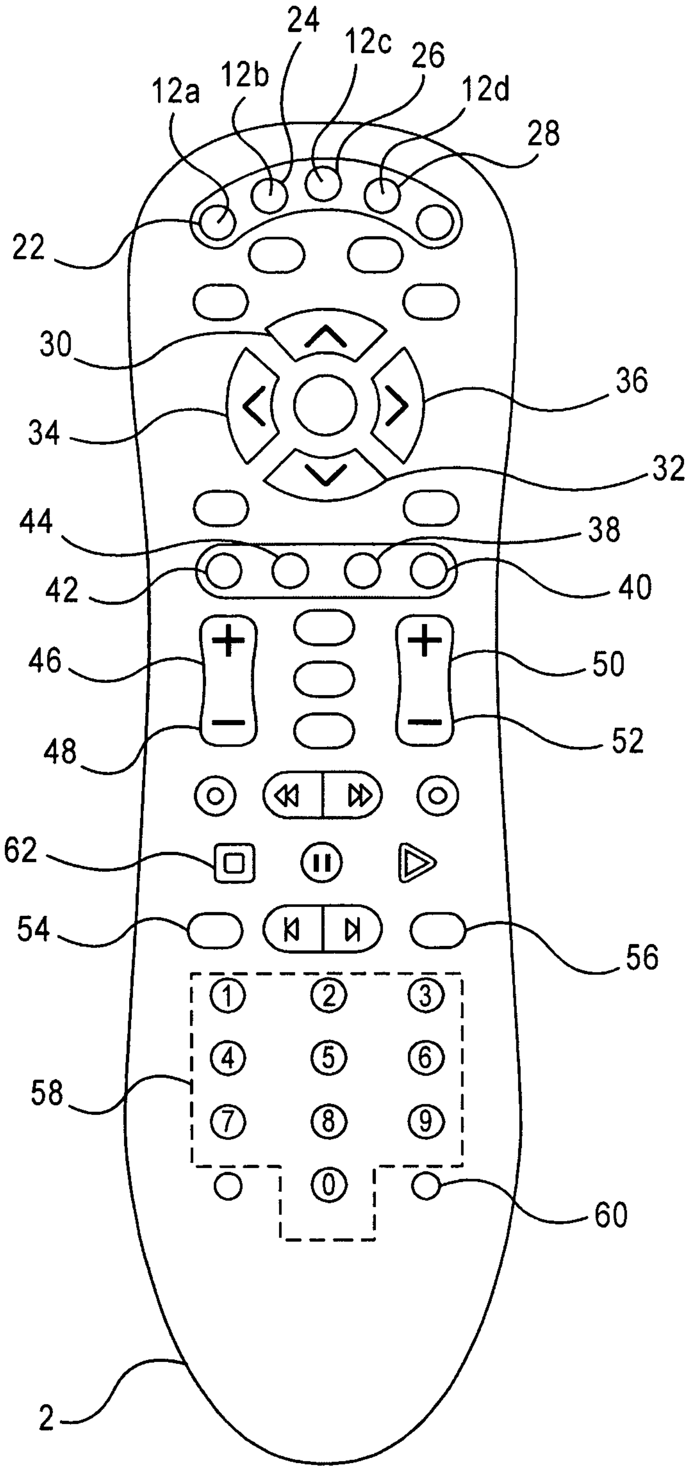
FIG. 3 illustrates layout of a keyboard and LCD display of a universal remote controller in accordance with embodiments of the present invention.

FIG. 3 illustrates the universal remote controller 2 having the keyboard 6 and the LED display 12 in accordance with embodiments of the present invention. As shown in FIG. 3, the universal remote controller 2 includes four mode keys, specifically, an AUX key 22, a TV key 24, a DVD/VCR key 26 and a CBL key 28. Four LEDs 12*a*, 12*b*, 12*c* and 12*d* are located behind the AUX key 22, TV key 24, DVD/VCR key 26 and CBL key 28, respectively. The four LEDs 12*a*-12*d* constitute the LED display 6. The AUX key 22, TV key 24, DVD/VCR key 26 and CBL key 28 allow light to be emitted through these keys so that the LEDs 12*a*-12*d* are visible through the keys. The AUX LED 12*a* is preferably a green LED. The TV LED 12*b*, the DVD/VCR LED 12*c* and the CBL LED 12*d* are preferably red LEDs.

The AUX key 22 is used to toggle the universal remote controller 2 between the IR control mode of operation and the home automation (RF) control mode of operation. The AUX key 22 is used to toggle between the IR control mode of operation and the home automation control mode of operation because a user would intuitively select this key.

In accordance with preferred embodiments of the present invention, the default mode of the universal remote controller 2 is the IR control mode of operation. When the universal remote controller 2 is in the IR control mode of operation the various keys of the remote controller 2 are used to control standard functions of an IR remote controller.

After the AUX key 22 is pressed to switch the universal remote controller 2 to the home automation (RF) control mode of operation, the keys of the remote controller 2 function to activate and control functions related to the home automation mode of operation. The following description relates to the functions of the keys of the remote controller keyboard 6 after the universal remote controller 2 has been switched to the home automation control mode of operation.

In the home automaton control mode of operation, the digit keys (0-9) 58 function to enter a node number of a node in the home automation network. A LIVE TV key 54 functions to add a node to a home automation network. A LIST key 56 is used to delete a node from the home automation network. A volume up key VOL+ 46 and a volume down key VOL− 48 are used to control increase and decrease, respectively, of the level attenuation/intensity of a node. For example, to increase light intensity, the VOL+ key 46 is pressed.

The keyboard of the universal remote controller 2 includes several color keys, including a YELLOW key 38, a BLUE key 40, a RED key 42 and a GREEN key 44. In the IR control mode of operation, the color keys 38, 40, 42 and 44 perform special functions. In the home automation control mode of operation, each of the color keys 38, 40, 42 and 44 are used to access and control a group of nodes that perform a particular function. An up arrow key 30, a down arrow key 34, a left arrow key 36 and a right arrow key 38 are referred to as "scene keys" and are used to apply a particular function to a group of nodes. For example, a particular function may be turning on or off the group of nodes.

The LEDs 12*a*-12*d* are used to convey information to the user of the universal remote controller 2 as the user navigates through operations in the home automation control mode of operation. In accordance with preferred embodiments of the present invention, the AUX LED 12*a* blinks to indicate success of an operation. For example, the AUX LED 12*a* will blink a predetermined number of times at a predetermined interval, such as three times at an interval of two seconds on and two seconds off, to indicate success of an operation. The AUX LED 12*a* will blink to indicate success of operations of the remote controller 2 such as turning ON/OFF of a node, dimming a node or group, setting a group, setting a scene, secondary controller and reset. To indicate that an operation is being executed or is in process, all of the AUX LED 12*a*, TV LED 12*b*, DVD/VCR LED 12*c* and CBL LED 12*d* are switched on. All of the LEDs 12*a*-12*d* are turned on to indicate execution of operations such as processing commands and performing the functions of turning on/off a node, dimming a node or group, setting a group, setting a scene, secondary controller and reset. To indicate failure of an operation of the universal remote controller 2 or to indicate an error, all of the LEDs 12*a*-12*d* are caused to blink a predetermined number of times at a predetermined interval. For example, all of the LEDs 12*a*-12*d* will blink four times, on for 0.25 seconds and off for 0.25 seconds, to indicate failure or error in an operation. The LEDs 12*a*-12*d* blink four times to indicate failure of the commands/operations such as turning on/off, dimming, group, scene, secondary controller and reset.

Table 1 below summarizes examples of the keys of the keyboard 6 associated with the home automation mode of operation of the universal remote controller 2 and corresponding functions that are executed in response to press and release of the respective keys.

TABLE 1

| KEY | FUNCTION |
|---|---|
| AUX | Toggles between IR control mode and RF control mode of operation |
| Volume + (VOL+) | Dimmer Up |
| Volume − (VOL−) | Dimmer Down |
| Channel + (CH+) | Switch ON |
| Channel − (CH−) | Switch OFF |
| LIVE TV | Add node |
| LIST | Delete Node |
| Digit Keys (0-9) | Used to allocate node numbers |
| Yellow key | Group I control |
| Blue key | Group II control |
| Red key | Group III control |
| Green key | Group IV control |
| Arrow left | Scene control for Group I |
| Arrow up | Scene control for Group II |
| Arrow right | Scene control for Group III |
| Arrow down | Scene control for Group IV |
| STOP | Resets the home automation module when pressed along with ENTER key |
| PLAY | Used to set up secondary controller source |
| PAUSE | Used to set up secondary controller destination |

As shown in FIGS. 1 and 3, the LED display 12 of the universal remote controller 2 preferably includes four LEDs 12*a*, 12*b*, 12*c* and 12*d* to assist the user in navigating through the home automation mode of operation of the universal remote controller 2. Although preferred embodiments of the present invention are described as including four LEDs, it is possible to have fewer or more than four LEDs. The LEDs 12*a*-12*d* are preferably located behind the mode keys AUX 22, TV 24, DVD/VCR 26 and CBL 28 such that the light emitted by the LEDs 12*a*-12*d* is visible through the respective mode keys 22, 24, 26, and 28.

The respective colors and the blinking rates of the various LEDs 12*a*-12*d* are selected to convey information to the user regarding navigating through the home automation mode of operation in a manner that can be quickly and easily understood by the user. More specifically, the AUX LED 12*a* is preferably a green LED that blinks to indicate success of an operation. The TV LED 12*b*, the DVD/VCR LED 12*c* and the CBL LED 12*d* are preferably red LEDs that blink to indicate failure of an operation.

Table 2 below summarizes the operation of the LED display 12 in accordance with embodiments of the present invention.

TABLE 2

| LED DISPLAY | LED FUNCTION | OPERATION |
|---|---|---|
| AUX LED 12a | The AUX LED 12a blinks three times to indicate success of an operation. The color of the AUX LED 12a is green. | The operations in response to which the AUX LED 12a blinks three times include mode change; turning ON/OFF, dimming, group, scene, secondary controller and reset. |
| All LEDs AUX LED12a, TV LED 12b, DVD/VCD LED 12c and CBL LED 12d. | All LEDs 12a-12d switch ON during execution of an operation. | The operations in response to which all LEDs switch ON include processing commands/performing function, ON/OFF, dimming, group, scene, secondary controller and reset. |
| All of the LEDs, AUX LED12a, TV LED 12b, DVD/VCD LED 12c and CBL LED 12b. | All LEDs 12a-12d blink four times indicating failure of an operation. | The operations in response to which all LEDs blink four times include failure of a command/operation, turning ON/OFF, dimming, group, scene, secondary controller and reset. |

The detailed operation of the universal remote controller 2 in accordance with preferred embodiments of the present invention will now be described below with reference to the flowcharts shown in FIGS. 4-13. The operations in the flowcharts shown in FIGS. 4-13 correspond to control functions stored in the memory 8 of the control unit 4.

LED Display Function

Figure 4:
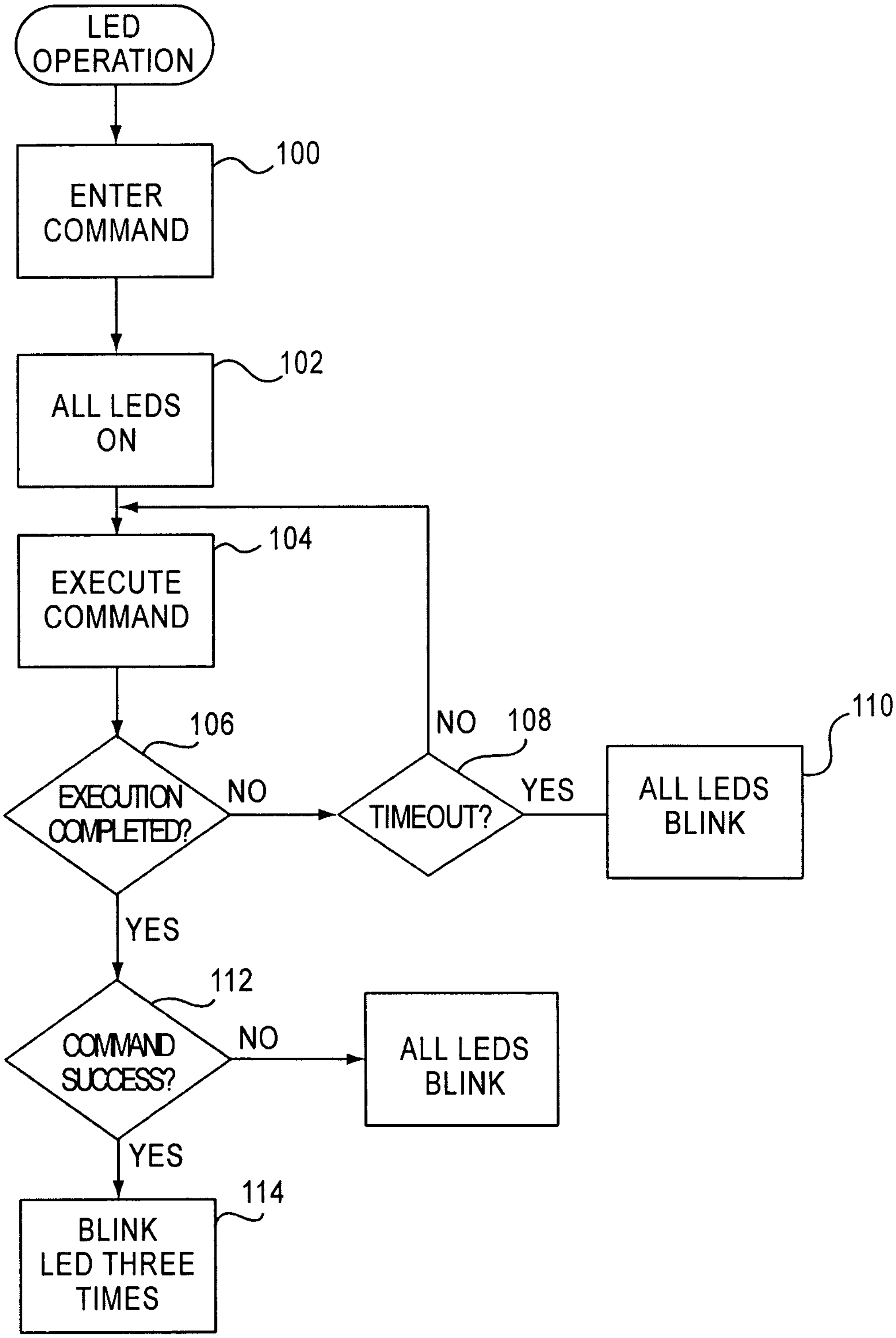
FIG. 4 is a flowchart illustrating an operational process that is performed to control functions of the LED display 12 in accordance with embodiments of the present invention.

FIG. 4 is a flowchart illustrating a generalized operational process that is performed to control functions of the LED display 12 in accordance with embodiments of the present invention. As described above, the LEDs 12*a*-12*d* of the LED display 12 are activated to convey information to the user.

As shown in FIG. 4, when a command is entered (step 100), all of the LEDs 12*a*-12*d* are switched on to indicate that a function is being processed (step 102). The command entered in step 100 is then executed (step 104). A determination is then made as to whether execution of the command is completed (step 106). If execution of the command is not completed (NO, step 106), it is determined whether a timeout has occurred (step 108). If a timeout has occurred (YES, step 108) and the execution of the command has not been completed, all LEDs 12*a*-12*d* are caused to blink (step 110) indicating failure of the execution of the command. If a timeout has not occurred (NO, step 108), execution of the command continues (step 104). However, when execution of the command has been completed (YES, step 106), it is then determined whether execution of the command was completed successfully (step 112). If the execution of the command was not completed successfully (NO, step 112), then all LEDs are caused to blink indicating failure of the command execution. If execution of the command is completed successfully (YES, step 112), then the AUX LED 12*a* is caused to blink three times (step 114) indicating successful execution of the command.

Mode Selection

Figure 5:
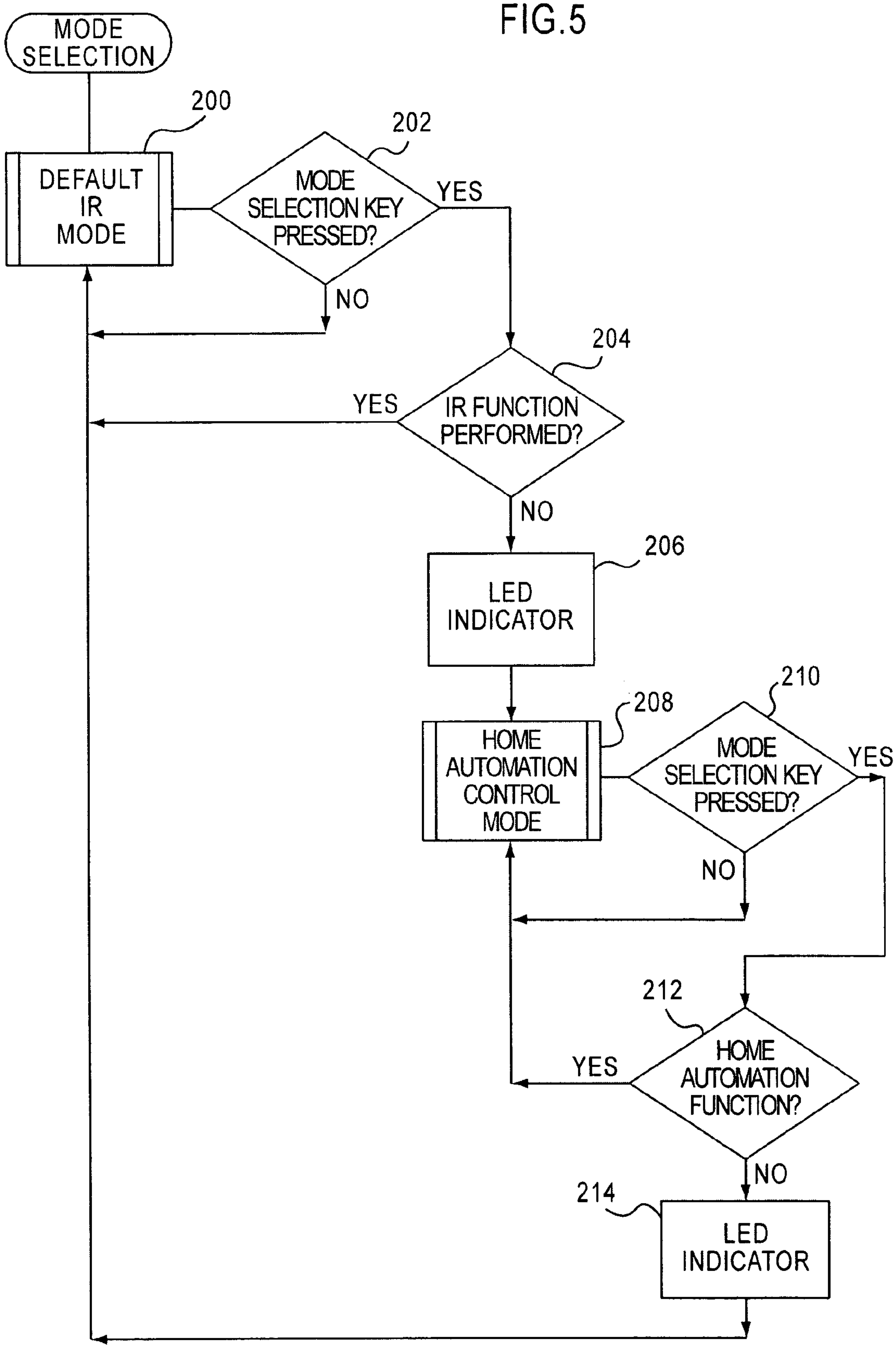
FIG. 5 is a flowchart illustrating a mode selection process for selecting either an IR control mode or a home automation control mode of the universal remote controller in accordance with embodiments of the present invention.

FIG. 5 is a flowchart illustrating a mode selection process for selecting either the IR control mode or the home automation control mode of the universal remote controller 2 in accordance with embodiments of the present invention. The universal remote controller 2 includes a mode selection key to toggle between the IR control mode of operation and the home automation mode of operation. Although various keys may operate as the mode selection key, in accordance with preferred embodiments of the present invention, the AUX key 22 is a mode selection key that allows the user to toggle the universal remote controller 2 between the IR control mode of operation and the home automation control mode of operation (i.e., the RF mode).

As shown in the flowchart of FIG. 5, the default mode of operation of the universal remote controller 2 is preferably the IR control mode (step 200). However, it is possible to set the default mode as the home automation mode of operation. In accordance with preferred embodiments of the present invention, while the universal remote controller 2 is in the IR control mode of operation, the mode selection process of the universal remote controller 2 monitors whether a user presses the AUX key 22 once (step 202). If the AUX key 22 is not pressed (NO, step 202), then the remote controller 2 remains in the IR mode of operation. However, when the AUX key 22 is pressed while the universal remote controller 2 is in the IR control mode (YES, step 202), it is then determined whether the universal remote controller 2 is performing an IR function (step 204). If the universal remote controller 2 is performing an IR function (YES, step 204), then the remote controller 2 remains in the IR control mode of operation (step 200). The universal remote controller 2 will not enter into the home automation mode in response to pressing the AUX key 22 when the remote controller 2 is performing other functions. By way of example, if the remote controller 2 is in a direct code entry (DCE) mode or an auto code search mode, then pressing the AUX key 22 will have no effect and will not change the remote controller 2 to the home automation control mode of operation from the IR mode of operation. The universal remote controller 2 can determine whether an IR function is being performed by determining whether the remote controller 2 is in a sleep mode or a wait mode. If the remote controller 2 is in the sleep mode or the wait mode, then it is determined that no IR function is being performed. In accordance with preferred embodiments of the present invention, the universal remote controller 2 will enter into the home automation control automation mode from the IR control mode only when the AUX key 22 is pressed when the remote controller 2 is in the sleep mode or the wait mode.

If the AUX key 22 has been pressed and an IR function is not being performed (NO, step 204), then the universal remote controller will enter the home automation control mode of operation. The AUX LED 12*a* blinks three times (step 206) to signify successful entry into the home automation control mode of operation (step 208). While the universal remote controller 2 is in the home automation control mode (step 208), the mode selection process monitors whether the AUX key 22 is pressed (step 210). If the AUX key 22 is not pressed (NO, step 210), then the remote controller 2 remains in the home automation control mode of operation. However, if the AUX key 22 is pressed (YES, step 210), then it is determined whether the remote controller 2 is performing any home automation control function (step 212). If the remote controller 2 is performing a home automation control function (YES, step 212), then the remote controller 2 remains in the home automation control mode. However, if no home automation function is being performed (NO, step 212), then the AUX LED 12*a* is caused to blink three times (step 214) to indicate successful return to the IR control mode, and the remote controller 2 is toggled back to the IR mode of operation (step 200).

When the universal remote controller 2 is in the home automation control mode, only the home automation functions of the remote controller 2 will operate. To perform remote control functions other than those associated with the home automation mode, the user must exit the home automation mode and enter into the IR control mode by pressing the AUX key 22 when the remote controller 2 is not performing any home automation function. For example, if an add node command (described in detail hereinbelow) is sent from the universal remote controller 2 to a node and the universal remote controller 2 is waiting for acknowledgement from the node, then pressing of the AUX key 22 will not change the mode of operation of the universal remote controller 2 during the time between sending the add node command and waiting for the acknowledgment from the node.

In accordance with preferred embodiments of the present invention, the mode of operation of the universal remote controller 2 will change only after the AUX key 22 is pressed and released. If the AUX key 22 is not released, the mode of operation of the universal remote controller 2 will not change, and the remote controller 2 will remain in the same mode. If the AUX key 22 is released after a stuck key timeout period, described below, then the mode of operation of the universal remote controller 2 will not change.

Stuck Key Timeout

In accordance with preferred embodiments of the present invention, home automation functions of the universal remote controller 2, such as adding a node, deleting a node, setting a group, programming a scene, ON/OFF, UP/DOWN and mode selection, will be executed only after key release. If any functional key is held down or remains stuck in a depressed state for more than a predetermined time period, for example, sixty seconds, then the universal remote controller 2 enters a sleep mode (described below). The function associated with the stuck key will not be executed after the universal remote controller 2 has entered the sleep mode. To perform the function associated with the stuck key, the stuck key must be released from the stuck key mode, and the key must be pressed and released again.

Sleep Mode

If there is no activity in the universal remote controller 2 for more than a predetermined time period, for example, sixty seconds, then the universal remote controller 2 will enter a sleep mode. In the sleep mode, both the IR control mode and the home automation control mode are in the sleep mode. During sleep mode, the universal remote controller 2 will consume less power, for example, approximately 3 μamps. The remote controller 2 will wake up from the sleep mode when any key is pressed.

Home Automation Control Mode of Operation

Figure 6:
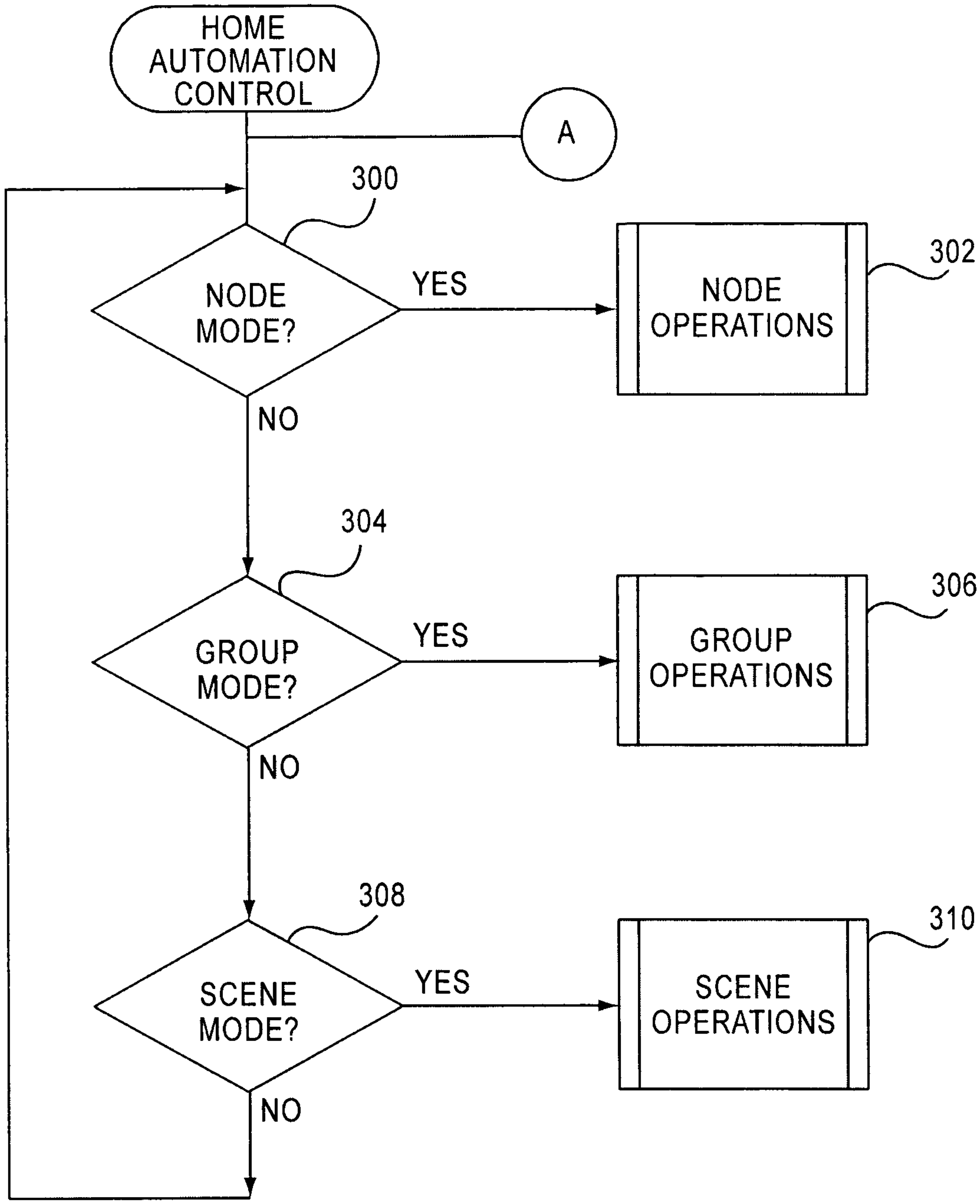
FIG. 6 is a flowchart illustrating an operational process for controlling a universal remote controller in a home automation control mode of operation in accordance with embodiments of the present invention.

FIG. 6 is a flowchart illustrating an operational process for controlling the universal remote controller 2 in the home automation control mode of operation in step 208 of FIG. 5 in accordance with embodiments of the present invention.

As shown in FIG. 6, in the home automation control mode, operations to determine a mode of home automation control of the universal remote controller 2 are performed. In particular, it is determined whether the universal remote controller 2 is in a node mode of operation (step 300). For example, it may be determined that the universal remote controller 2 is in the node mode in response to entry of a node number of a node device on the keyboard 6. If it is determined that the universal remote controller 2 is in the node mode (YES, step 300), then the universal remote controller 2 performs operations to issue commands to control node devices in the home automation network (step 302). In accordance with embodiments of the present invention, the universal remote controller 2 issues commands to control operations of adding a node, deleting a node, switching a node on or off, and controlling the level attenuation/intensity of a node.

If it is determined that the universal remote controller 2 is not in the node mode (NO, step 300), then it is determined whether the universal remote controller 2 is in a group mode of operation (step 304). For example, it may be determined that the universal remote controller 2 is in the group mode in response to pressing a particular key on the keyboard 6. If it is determined that the universal remote controller 2 is in the group mode (YES, step 304), then the universal remote controller 2 is controlled to issue commands to control operations of groups of node devices in the home automation network (step 306). For example, in accordance with embodiments of the present invention, in the group mode, the universal remote controller 2 issues commands to control operations of switching on or off a group of nodes, and controlling the level attenuation/intensity of a group of nodes.

If it is determined that the universal remote controller 2 is not in the group mode (NO, step 304), then it is determined whether the remote controller 2 is in a scene mode of operation (step 308). For example, it may be determined that the universal remote controller 2 is in the scene mode in response to pressing particular keys on the keyboard 6. If it is determined that the universal remote controller 2 is in the scene mode (YES, step 304), then the universal remote controller 2 is controlled to issue commands to control operations to program a scene in a group of node devices in the home automation network (step 310). If the universal remote controller is not in a scene mode of operation (NO, step 310), then the control returns to step 300.

Add/Delete Node

Figure 7:
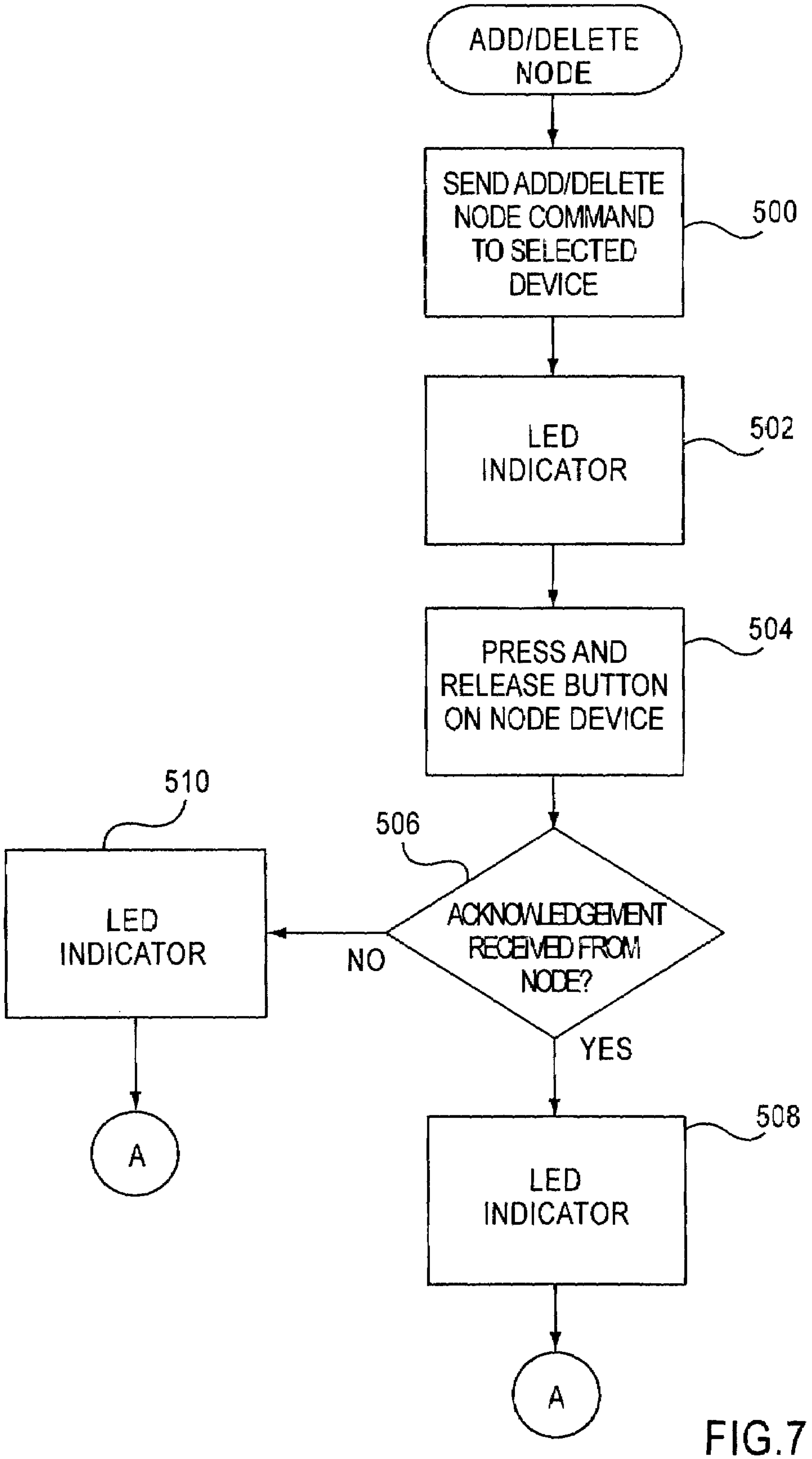
FIG. 7 is a flowchart illustrating an operational process to add or delete a home automation node device from the home automation network in accordance with embodiments of the present invention.

FIG. 7 is a flowchart illustrating an operational process to add or delete a home automation node device from the home automation network corresponding to operations performed in step 302 of FIG. 6. The operational process shown in FIG. 7 is performed after it is determined that a node mode of operation has been entered in step 300 in FIG. 6.

To add a device that responds to home automation mode commands to the home automation network, an "add node" command is sent from the home automation module 14 of the universal remote controller 2 to a selected home automation device node (step 500). In accordance with preferred embodiments of the present invention, the add node command is sent by pressing and releasing the LIVE TV key 54 on the universal remote controller 2 while the remote controller 2 is in the home automation control mode. However, the LIVE TV key 54 is merely an example, and it is envisioned that other keys may be used to achieve the add node function. To delete a node device from the home automation network, a "delete node" command is sent from the home automation module 14 of the universal remote controller 2 to a node selected for deletion (step 500). In accordance with preferred embodiments of the present invention, the delete node command is sent by pressing and releasing the LIST key 56 while the universal remote controller 2 is in the home automation control mode. However, the LIST key 56 is merely an example, and it is envisioned that other keys may be used to achieve the delete node function. At this time, all of the LEDs AUX 12*a*, TV 12*b*, DVD/VCR 12*c* and CBL 12*d* will switch ON to signify processing of the add node command or the delete node command (step 502).

Next, a button on the node device to be added to the home automation network or deleted from the home automation network is pressed and released (step 504). For example, in Z-WAVE, the button on the node device to be added to or deleted from the home automation network and the key on the universal remote controller 2 that is pressed to add/delete the node must be pressed simultaneously. However, in other home automation networks, the adding/deleting function is more automated.

The node to be added or deleted will send an acknowledgement message back to the universal remote controller 2 if the add node command or delete node command is properly received. If the universal remote controller 2 receives the acknowledgement message from the node to be added or deleted (YES, step 506), then the AUX LED 12*a* will blink three times indicating successful addition/deletion of the node to the home automation network (step 508). After the successful addition of the node to the network or successful deletion of the node from the network, the operational process then returns to Ⓐ in FIG. 6 where the operational process determines whether particular mode is entered.

If an acknowledgement message is not received from the node to be added or deleted within a predetermined time period, for example 30 seconds, or if data received from the node is different from acknowledgement data (NO, step 506), then all of the LEDs, AUX 12*a*, TV 12*b*, DVD/VCR 12*c* and CBL 12*d*, will blink four times indicating failure of the node addition/deletion (step 510). After the failure of the addition/deletion of the node to/from the network, the operational process then returns to Ⓐ in FIG. 6 where it is determined whether a particular mode is entered.

The universal remote controller 2 can send the add node command or the delete node command to the node device only when the controller 2 is in the home automation mode. If a particular node has already been added to or deleted from the home automation network, and an add node command is sent to add the same node again to the network or a delete node command is sent to delete the same node again from the network, then the node will not accept this command. In this case, the universal remote controller 2 will not receive an acknowledgement from the node to be added or deleted.

If any other key on the universal remote controller 2 is pressed during a time period after the add node command or the delete node command is sent from the universal remote controller 2 (step 500) and before receiving the acknowledgement message from the home automation node device at the universal remote controller 2 (YES, step 506), then the key pressed during this time period will be ignored. A signal or command issued by pressing and releasing a key on the universal remote controller 2 after the add node command or the delete node command is sent to a node will be effective only after a timeout or after receipt of the acknowledgement command from the home automation node device to be added or deleted.

After the successful addition of a node device to the home automation network, a node address will be automatically assigned to the added node. For example, if the added node is a first node added to the home automation network, then the added node is assigned the address 01. If the added node is a second node added to the home automation network, then the added node is assigned an address 02, and so on.

In accordance with preferred embodiments of the present invention, a maximum of twelve nodes can be added to the home automation network. If a user attempts to add more than the maximum number of nodes, then an acknowledgement message will not be received (NO, step 506), and all LEDs AUX 12*a*, TV 12*b*, DVD/VCR 12*c* and CBL 12*d* will blink four times indicating failure of node addition (step 510). However, it will be recognized that the maximum number of nodes that may be added to the home automation network may be fewer than or more than twelve nodes.

The universal remote controller 2 will delete an address of a currently deleted node from a stored list and will keep the place empty for further node addition.

Set Node ON/OFF

Figure 8:
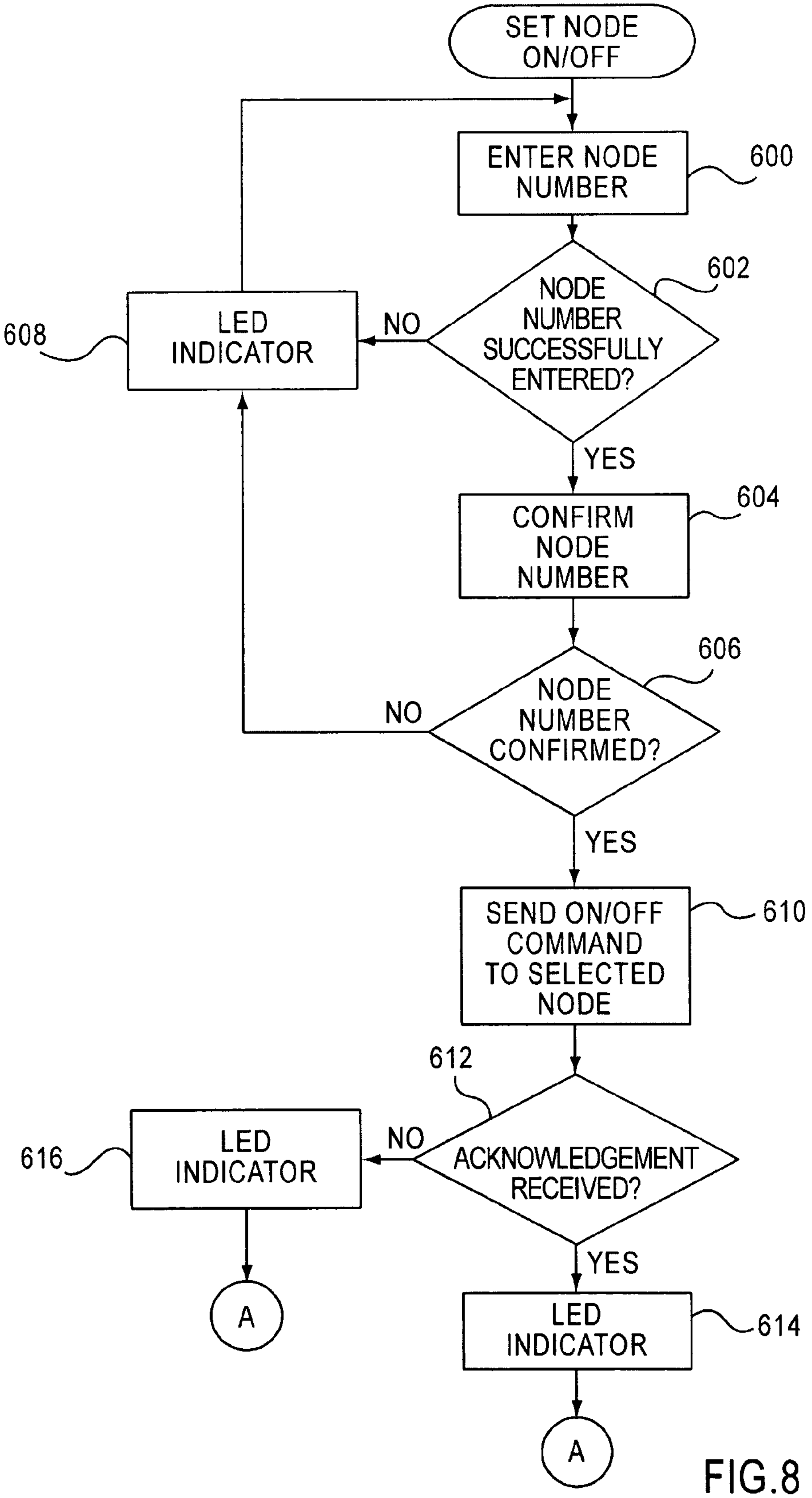
FIG. 8 is a flowchart illustrating an operational process to set a selected node in a home automation network to an ON state or an OFF state in accordance with embodiments of the present invention.

FIG. 8 is a flowchart illustrating an operational process to set a selected node in a home automation network to an ON state or an OFF state corresponding to the node operations performed in step 302 in FIG. 6. The operational process shown in FIG. 8 is performed after it is determined that a node mode has been entered in step 300 in FIG. 6.

As shown in FIG. 8, to send an ON/OFF command to a home automation node device, first, the node number of a selected device is entered by pressing two keys (0-9) of the digit keys 58 (step 600, also corresponds to YES, step 300). For example, to send an ON/OFF command to a home automation node device #7, a user first presses and releases the digit "0" key, and then presses and releases the digit "7" key. In accordance with preferred embodiments of the present invention, the time between pressing and releasing the first key "0" and the second key "7" should be less than or equal to a predetermined time, for example, ten seconds. The time between pressing and releasing the first key and the second key is preferably measured between releases of the respective keys. If the second key "7" is pressed and released after the predetermined time from the press and releasing the first key "0", then the second pressed key will be considered a first pressed key of the two-digit node number.

If the node number of the node to be set on or off is successfully entered by pressing and releasing the two digit keys 58 within the predetermined time period (YES, step 602), the ENTER key 60 is then pressed to confirm the node number (step 604). However, if the node number is not successfully entered (NO, step 602), the universal remote controller 2 will indicate an error on the LED display 12 by blinking all of the AUX LED 12*a*, TV LED 12*b*, VCR/DVD LED 12*c* and CBL LED 12*d* four times (step 608). The node number must then be entered again (step 600). In accordance with preferred embodiments of the present invention, the ENTER key 60 should be pressed to confirm the node number within a predetermined time period, for example ten seconds, from the press and release of the second digit key of the node number. If the ENTER key 60 is pressed after the predetermined time period from the press and release of the second digit key expires, then node number will not be confirmed (NO, step 606) and the universal remote controller 2 will indicate an error on the LED display 6 by blinking all of the AUX LED 12*a*, TV LED 12*b*, VCR/DVD LED 12*c* and CBL LED 12*d* four times (step 608). Furthermore, if the ENTER key 60 is pressed in step 604 after pressing only one digit key, then the node number will not be confirmed (NO, step 606), and the universal remote controller 2 will indicate an error by blinking all of the AUX LED 12*a*, TV LED 12*b*, VCR/DVD LED 12*c* and CBL LED 12*d* four times (step 608). At this point, after an error is indicated (step 608), the operational process proceeds to step 600 and the user is required to re-enter the two digit keys 58 representing the home automation device node number.

If the home automation node device number is confirmed by properly pressing the ENTER key 60 (YES, step 606), an "on command" can be sent to the selected node by pressing and releasing the CH+ key 50 of the remote controller 2 (step 610), or an "off command" can be sent to the selected node by pressing and releasing the CH− key 52 (step 610). The selected node will send an acknowledgement message to the universal remote controller 2 if the "on command" or the "off command" has been successfully received and executed. Next, it is determined whether the acknowledgement message is received from the selected node (step 612). The AUX LED 12*a* will blink three times (step 614) to indicate the successful execution of the "on command" or the "off command" if the home automation module 14 of the universal remote controller 2 receives the acknowledgement message from the selected node (YES, step 612). After indicating successful execution of the node on/off command, the process returns to Ⓐ in FIG. 6.

In accordance with preferred embodiments of the present invention, the acknowledgement from the selected node should be received within a predetermined time period, for example, thirty seconds. If the acknowledgement from the selected node is not received within thirty seconds or data received from the selected node is different from acknowledgement data (NO, step 612), then all of the AUX LED 12*a*, TV LED 12*b*, VCR/DVD LED 12*c* and CBL LED 12*d* will blink four times indicating failure of the "on command" or the "off command" (step 616) and the process returns to Ⓐ in FIG. 6.

In the operational process shown in FIG. 8, if the CH+ key 50 or the CH− key 52 is pressed without having properly entered the digits designating the selected node device, then the universal remote controller 2 will send the ON/OFF command to a previously selected node number. The previously selected node number is stored in the remote controller memory 8.

If any key other than the VOL+ key 46, VOL− key 48, CH+ key 50, CH− key 52 and the AUX key 22 is pressed after successful entry of the node number, this key press will be ignored and all of the AUX LED 12*a*, TV LED 12*b*, VCR/DVD LED 12*c* and CBL LED 12*d* will blink four times indicating error. If the AUX key 22 is pressed after entry of the node number, the mode will change to the IR mode.

Set Node Level Attenuation/Intensity

Figure 9:
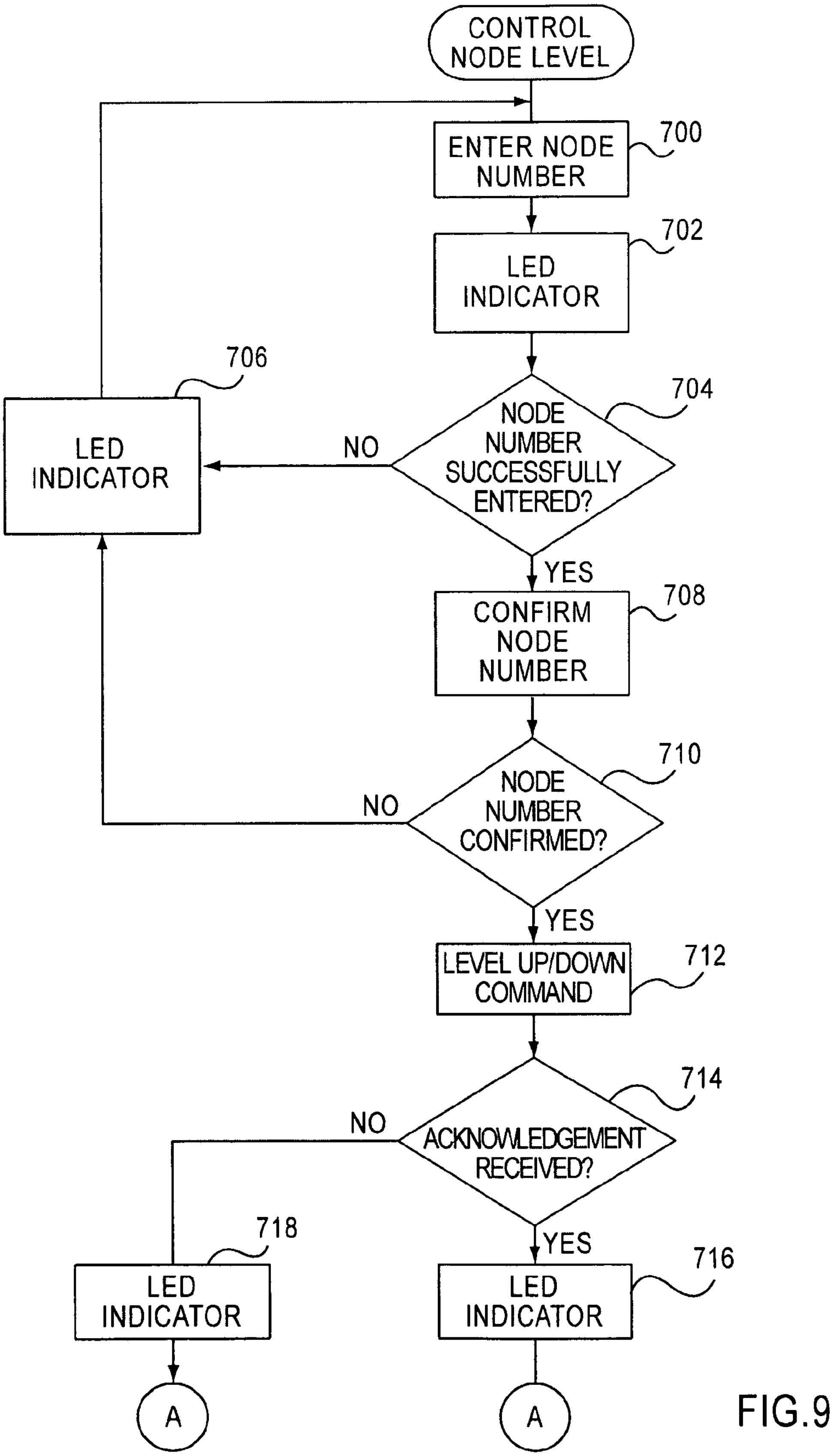
FIG. 9 is a flowchart illustrating an operational process to set level intensity/attenuation of a selected node in a home automation network in accordance with embodiments of the present invention.

FIG. 9 is a flowchart illustrating an operational process to control the level attenuation/intensity of a node in a home automation network corresponding to operation performed in step 302 in FIG. 6. The command to control the level attenuation/intensity is also referred to as a "dimmer up/down" command. The operational process shown in FIG. 9 is performed after it is determined that a node mode of operation has been entered in step 300 in FIG. 6. In accordance with preferred embodiments of the present invention, a volume up key VOL+ 46 and a volume down key VOL− 48 are used to control the level attenuation/intensity of a node or a group of nodes. For example, to increase light intensity of a node, the VOL+ key 46 is pressed. The operational process performed in step 302 for controlling the level attenuation/intensity of a group of nodes will be described below with reference to FIG. 9.

As shown in FIG. 9, to send a command to control the level attenuation/intensity of a home automation node device, first, a node device number of a node device designated for the node level up/down function is entered by pressing two digit keys (0-9) (step 700, also corresponds to YES, step 300 in FIG. 6). For example, to send a "dimmer up/down" command to a node #12, the digit key "1" is pressed and released. Then the digit key "2" is pressed and released. In accordance with preferred embodiments of the present invention, the time between pressing and releasing the two digit keys should be less than or equal to a predetermined period of time, for example, ten seconds. If the second key is pressed after the predetermined time period has expired, then the second pressed key will be consider the first key pressed.

When the remote controller 2 is in a waiting state after the first digit key is pressed or before the ENTER key 60 is pressed to confirm the node number (step 708 below), all of the AUX LED 12*a*, TV LED 12*b*, VCR/DVD LED 12*c* and CBL LED 12*d* will remain ON to indicate execution of the operation (step 702).

If the node number of the node whose level is to be controlled is successfully entered by pressing and releasing the two digit keys 58 within the predetermined time period (YES, step 704), the ENTER key 60 is pressed to confirm the designated node device number (step 708). However, if the node number is not successfully entered (NO, step 704), then all of the AUX LED 12*a*, TV LED 12*b*, VCR/DVD LED 12*c* and CBL LED 12*d* will blink four times indicating an error (step 706) and the node number is entered again (step 700).

In accordance with preferred embodiments of the present invention, the ENTER key 60 should be pressed to confirm the node number within a predetermined period of time, for example ten seconds, from pressing and releasing the second digit key. If the ENTER key 60 is pressed after the predetermined period of time elapses, then the node number will not be confirmed (NO, step 710), and the universal remote controller 2 will indicate an error by causing all of the AUX LED 12*a*, TV LED 12*b*, VCR/DVD LED 12*c* and CBL LED 12*d* to blink four times (step 706). The user must then re-enter the two-digit node number (step 700) to proceed further. Similarly, if the ENTER key 60 is pressed after only one digit key is pressed, or if the ENTER key 60 is pressed prior to entering both digit keys, then the LED display 12*a*-12*d* will indicate an error by blinking four times (step 706), and the user must re-enter the two digit keys (step 700) indicating the designated node device to proceed further.

If the node device number is successfully confirmed (YES, step 708) by pressing the ENTER key 60, next, a command to increase or decrease the level of the selected node device (a "dimmer up/down" command) is sent to the selected node device by pressing and releasing the VOL+ key 46 or VOL− key 48 (step 712). For every press of the VOL+ key 46, a command will be sent to increase the intensity or attenuation of the node by a predetermined increment. For example, the predetermined increment may be 20%, and pressing of the VOL+ 46 key five times will cause a 100% increase of the intensity or attenuation of the selected node. For every press of the VOL− key 48, a command will be sent to decrease the intensity or attenuation of the selected node by a predetermined amount. For example, the predetermined amount that the intensity or attenuation of the node is decremented in response to pressing the VOL− key 48 may be 20%. The level of the node can be decrease by 100% with five presses of the VOL− key 48.

The selected node will send an acknowledgement message to the universal remote controller 2 if the command to increase/decrease the level intensity/attenuation has been successfully received and executed. Next, it is determined whether the acknowledgement message has been received from the selected node (step 714). In accordance with preferred embodiments of the present invention, the acknowledgement from the selected node should be received within a predetermined time period, for example, thirty seconds. If the acknowledgement message is received from the selected node within the predetermined time period (YES, step 714) then the AUX LED 22 will blink three times (step 716) to indicate the successful execution of the "dimmer up/down" command. After successful execution of the dimmer up/down command, the operational process returns to Ⓐ FIG. 6.

However, if the acknowledgement is not received from the selected node within the predetermined time period or if the received data is different from acknowledgment data (NO, step 714), all of the AUX LED 12*a*, TV LED 12*b*, VCR/DVD LED 12*c* and CBL LED 12*d* will blink four times indicating failure of the dimmer up/down command (step 718) and the operational process returns to Ⓐ in FIG. 6.

If the VOL+ key 46 or the VOL− key 48 is pressed without entering the digit keys 58 designating a node device, then the universal remote controller 2 will send the "dimmer up/down" command to a previously designated node. The node number of the previously designated node is stored in remote controller memory 8.

If any key other than the VOL+ key 46, VOL− key 48, CH+ key 50, CH− key 52 or AUX key 22 is pressed after a node number is entered, this key press will be ignored and all LEDs will blink four times to indicate error. If the AUX key 22 is pressed after the node number is entered, the mode will change to the default IR mode, as described above with reference to FIG. 5.

Reset

The "reset" command is used to reset the home automation module 14 in case the home automation module 14 is not working in a prescribed manner. This command will delete all information regarding the nodes that are already present in the network. The AUX LED 12*a* will blink three times to indicate the successful execution of the "reset" command if the control unit 4 receives an acknowledgement from the home automation module 14 within a predetermined period of time, for example, thirty seconds.

To reset the home automation module 14, first the STOP key 62 and the ENTER key 60 are pressed together for at least three seconds. The reset command will delete all information regarding the node devices that is already present in the memory 8. Preferably, the information regarding nodes is stored in the EEPROM of memory 8. The AUX LED 12*a* will blink three times to indicate the successful execution of the reset command if the control unit 4 receives an acknowledgement from the home automation module 14 within a predetermined period of time, for example, thirty seconds.

If an acknowledgement is not received within thirty seconds or received data is different from acknowledgment data, all of the AUX LED 12*a*, TV LED 12*b*, VCR/DVD LED 12*c* and CBL LED 12*d* will blink four times indicating failure. The home automation module 14 will not store any information regarding the nodes in the network after execution of the reset command. However, the nodes in the network still contain a node ID and a home ID. The node ID is and ID assigned to the node by a network when the node enters the network. The node ID is used to identify a node from other nodes in the network. The home ID, also referred to as a MAC ID, is the ID for the network. It is important to have a network ID because the same frequency is going to be used by many networks. Nodes will not be reset by the reset command.

After the home automation module 14 is reset, if the control unit 4 sends the "add node" command, nodes which are already present in the network will not respond. The user should send the "delete node" command and delete the nodes from the network. If any other combination of keys is pressed, other than the STOP key 62 and the ENTER key 60, that key combination will be ignored.

Setting a Group of Nodes

Figure 10:
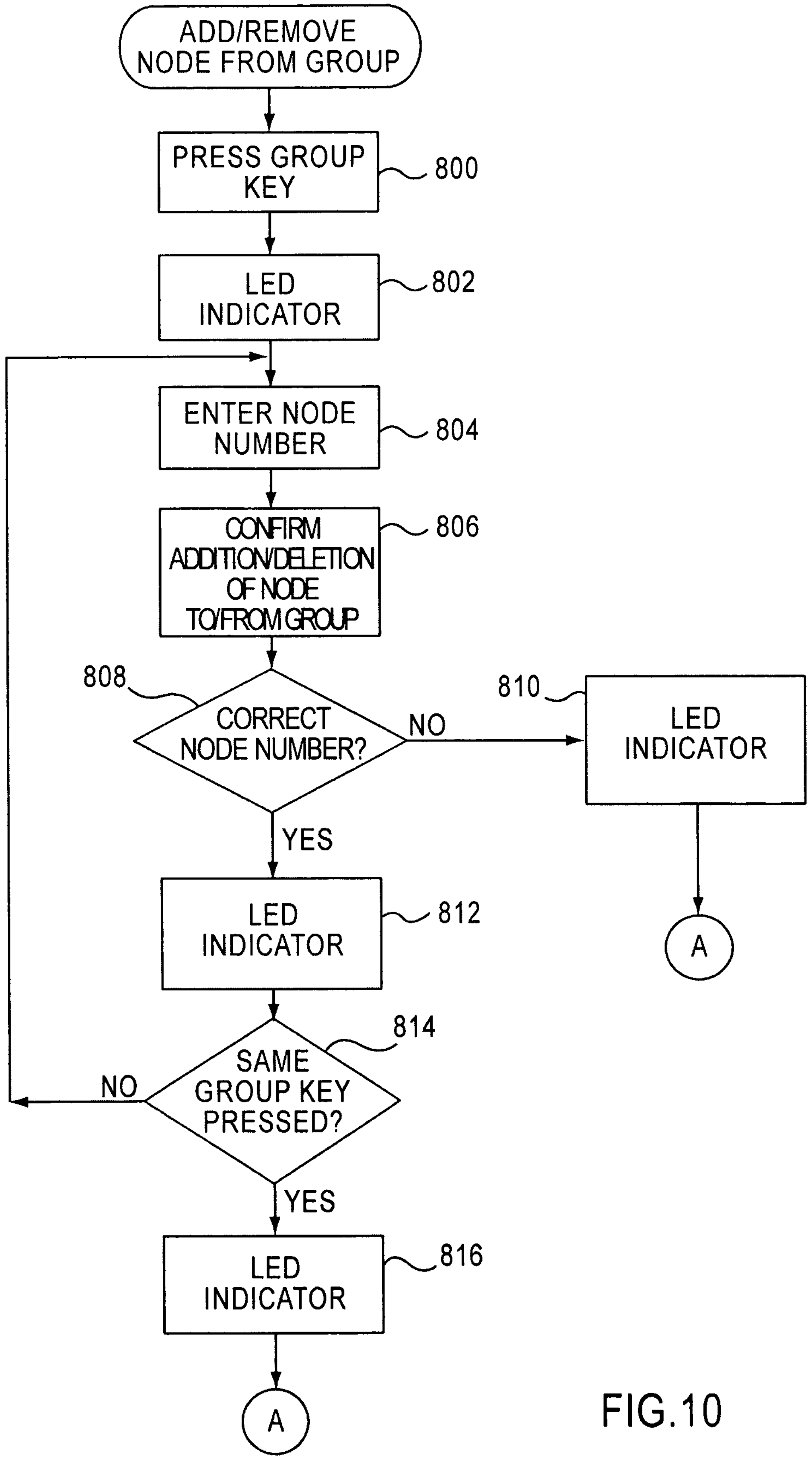
FIG. 10 is a flowchart illustrating an operational process to group two or more nodes in a home automation network for simultaneous control of the grouped nodes in accordance with embodiments of the present invention.

FIG. 10 is a flowchart illustrating an operational process to group two or more nodes in the home automation network corresponding to step 306 in FIG. 6. The operational process shown in FIG. 10 is performed after it is determined that a group mode has been entered in step 304 in FIG. 6.

In accordance with embodiments of the present invention, a group setting function is used to group two or more nodes in the home automation network. In accordance with preferred embodiments of the present invention, a maximum of three nodes are grouped together. However, it will be recognized that more than three nodes or fewer than three nodes may be grouped together. After grouping the nodes, the user can send commands to the group of nodes so that all of the nodes in the group respond to a command simultaneously.

In accordance with preferred embodiments of the present invention, the user can set four groups of nodes, and each group includes a maximum of three nodes. However, it will be recognized that the number of groups of nodes that can be set is variable and depends on the key availability in the universal remote controller 2. In accordance with preferred embodiments of the present invention, the default setting is no nodes present in any group. The universal remote controller 2 is used to configure and add designated nodes into a group.

When adding a node into a group, the user must first ensure that home automation node devices that the user desires to add to a group are already present in the home automation network. If a node is not present in the home automation network, the node must be added to the network using the "add node" process described hereinabove with reference to FIG. 7.

To add a node to a group, first, any one of the "YELLOW" key 38, "BLUE" key 40, "RED" key 42 or "GREEN" key 44 on the keyboard 6 is pressed and released (step 800, also corresponds to YES, step 304 in FIG. 6). In accordance with preferred embodiments of the present invention, the respective keys 38, 40, 42 and 44 are group keys that control a group of nodes simultaneously in response to pressing the group key. At this point, all LEDs 12*a*, 12*b*, 12*c* and 12*d* switch ON (step 802) indicating processing of the group setting command.

Next, using the digit keys 58, the user enters the two-digit number of the node device that the user desires to add into the group (step 804). For example, if the user wishes to add the second node in the home automation network into a group, the user enters the digit keys "0" and "2". To add the twelfth node in the network to the group, the user enters the digit keys "1" and "2". The LIVE TV key 54 is then pressed to confirm the addition of the designated node into the group (step 806). If the entered node number is not correct (NO, step 808), then all LED's 12*a*, 12*b*, 12*c*, 12*d* will blink four times indicating failure of node addition to the group (step 810), and the operational process returns to Ⓐ in FIG. 6. For example, if the entered node device number is greater than the maximum number of nodes, e.g., twelve, or if the node has already been added to the same group, a failure will be indicated. If the entered node number is correct, the AUX LED 12*a* will blink three times indicating successful addition of the node to the group (step 812).

After successful addition of a node to the group, it is then determined whether the same group key 38, 40, 42, 44 that was pressed in step 700 is pressed again (step 814). If the same group key is not pressed (NO, step 814), then another node can be added into the group by entering a two-digit node number (step 804) and pressing the LIVE TV key 54 (step 806). If the same group key 38, 40, 42, 44 is pressed and released again (YES, step 814), then addition of nodes into the group is completed. The AUX LED 12*a* then blinks three times to indicate successful completion of the addition of nodes into the group (step 816), and the operational process returns to Ⓐ in FIG. 6.

In accordance with preferred embodiments of the present invention, the user can set as many groups as there are color keys in the remote controller keyboard 6. For example, if there are only three color keys in the remote controller keyboard 6, then the user can set three groups. Therefore, the number of groups that can be set is only limited by the number of color keys available. Moreover, in accordance with embodiments of the present invention, the same node can be added into different groups.

The operation of removing a node from a group is similar to the operation of adding a node to a group. To remove a node from a group, first, the user must ensure that the home automation node device that the user desires to delete from the group has already been added to the home automation network and is a member of a particular group. If the node is not in the network and in the group, the user cannot delete the node from the group. Next, the user presses one of the group keys, that is, one of the YELLOW key 38, BLUE key 40, RED key 42 or GREEN key 44 (step 800). At this point, all LEDs 12*a*, 12*b*, 12*c*, 12*d* are switched on indicating processing of the group setting command (step 802).

Next, the user enters the two-digit node number that the user desires to delete from the group (step 804). Then, the LIST key 56 is pressed to confirm the deletion of the designated node from the group (step 806). If the entered node number is not correct (NO, step 808), then all LEDs 12*a*-12*d* will blink four times indicating failure of node deletion from the group (step 810), and the operational process returns to Ⓐ FIG. 6. For example, if the node number is greater than twelve or if the node is not in same group, then all the LEDs will blink indicating failure. If the node number entered in step 804 is correct (YES, step 808), then the AUX LED 12*a* will blink three times indicating successful deletion of the node from the group (step 812).

After successful deletion of the node from the group, it is then determined whether the same group key that was pressed in step 800 is pressed again (step 814). If the same group key is not pressed (NO, step 814), then another node can be deleted from the group by entering a two-digit node number (step 804) and pressing the LIST key 56 (step 806). If the same group key 38, 40, 42, 44 is pressed and released (YES, step 814), the deletion of nodes from the group is completed. The AUX LED 12*a* then blinks three times to indicate successful completion of the addition of nodes into the group (step 816), and the operational process returns to Ⓐ in FIG. 6.

Sending a Command to a Group of Nodes

Figure 11:
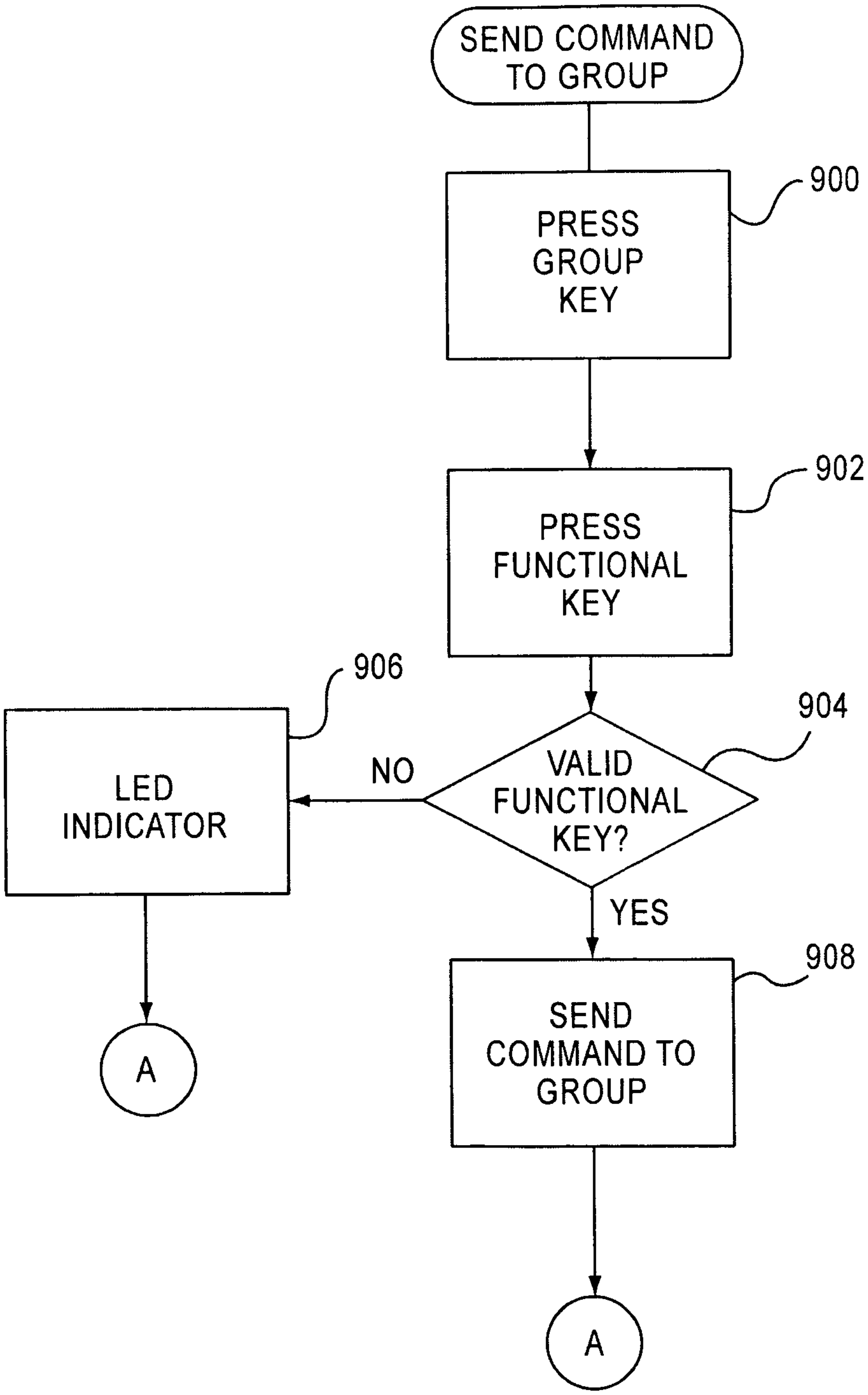
FIG. 11 is a flowchart illustrating an operational process to send a command to a group of nodes of the home automation system when the remote controller is in the group mode of operation in accordance with embodiments of the present invention.

FIG. 11 is a flowchart illustrating an operational process to send a command to a group of nodes of the home automation system when the remote controller 2 is in the group mode of operation corresponding to step 306 in FIG. 6.

As shown in FIG. 1, to send a command to a group of nodes, first, the user selects the group to which user wishes to send the command by pressing and releasing a respective group key (YELLOW key 38, BLUE key 40, RED key 42, or GREEN key 44) (step 900, also corresponds to YES step 304 in FIG. 6). After selecting the group to which a user desires to send a command, the command is sent to the group by pressing an appropriate functional key on the keyboard 6 (step 902). The operation process then determines whether the functional key pressed is a valid functional key (step 904). For example, the CH+ key 50 is pressed and released to switch on the nodes in the selected group. To switch off the nodes in the selected group, after pressing and releasing the group key (YELLOW key 38, BLUE key 40, RED key 42, or GREEN key 44) in step 900, the CH− key 52 is pressed and released to switch off the nodes in the group. Similarly, to perform a dimmer up/down function to change the level attenuation/intensity of a group of nodes, after selecting the group as described above in step 900, the VOL+ key 46 or the VOL− key 48 is pressed and released to increase or decrease, respectively, the level attenuation/intensity of the group of nodes. For example, the brightness of a group of lighting nodes can be changed by appropriately pressing the VOL+ key 46 or VOL− key 48.

In accordance with preferred embodiments of the present invention, if any key other than the digit keys 58, CH+ key 50, CH− key 52, VOL+ key 46, VOL− key 48, up arrow key 30, down arrow key 32, right arrow key 36 and left arrow key 34 is pressed, then a valid functional key has not been pressed (NO, step 904). This key press will be ignored and all LEDs 12*a*-12*d* blink four times indicating an error (step 906). The operational process then returns to Ⓐ in FIG. 6. However, if a valid functional key is pressed (YES, step 908), then the command corresponding to the functional key is sent to the group of nodes selected in step 900. The operational process then returns to Ⓐ in FIG. 6.

In accordance with preferred embodiments of the present invention, a maximum time delay between pressing and releasing a group key (after key release) and pressing a valid functional key, such as CH+ 50, CH− 52, VOL+ 46 and VOL− 48, should be less than or equal to five seconds. If a valid functional key is pressed after five seconds, the function associated with that key is not performed. To send the command to the desired group of nodes, the respective group key 38, 40, 42, 44 is pressed again and the above steps 900-908 are repeated. For example, if the CH+ key 50 is pressed after five seconds from press and release of a group key 38, 40, 42, 44, a command will be sent to turn "ON" a previously selected node.

Setting a Scene

Figure 12:
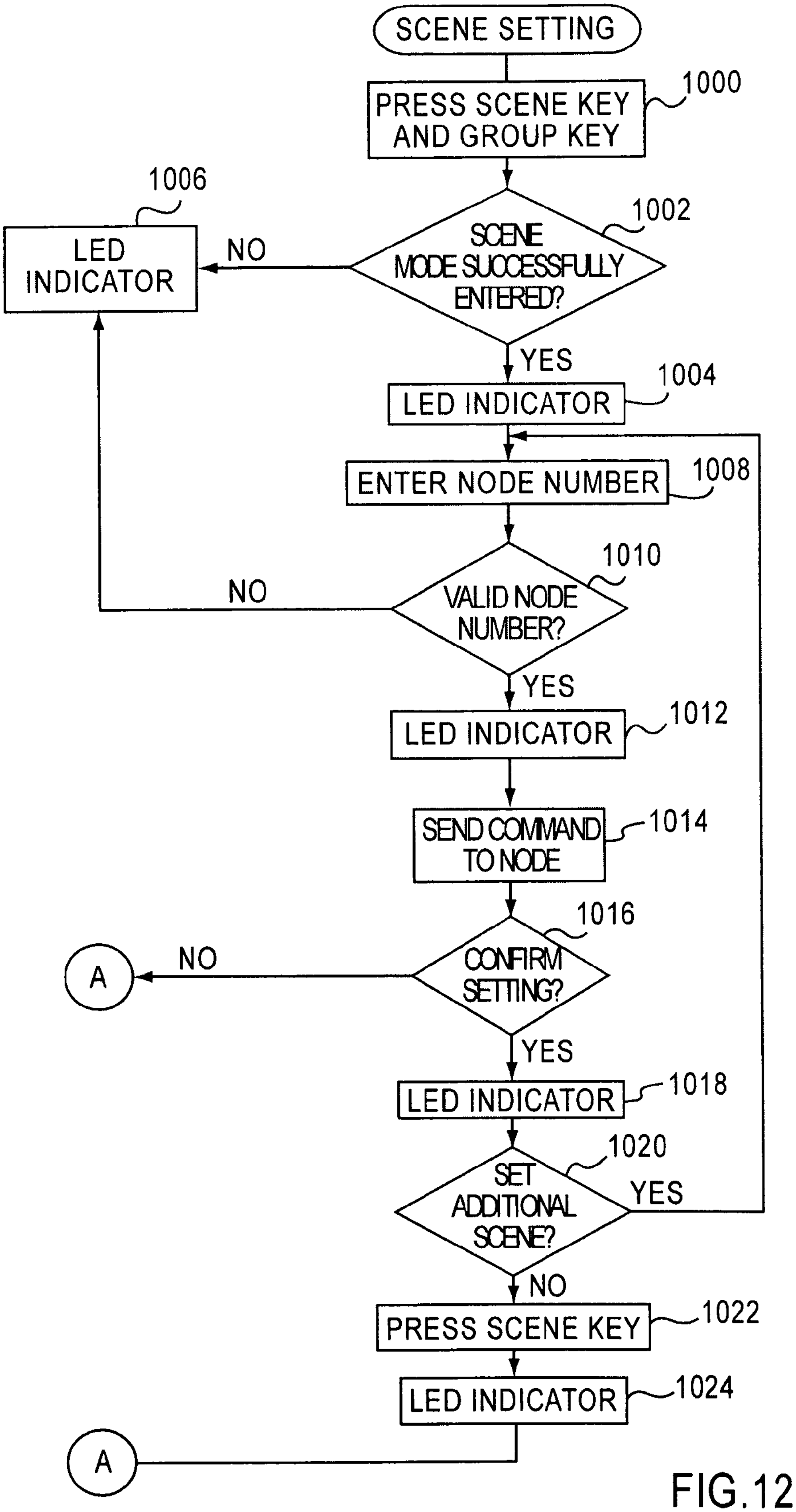
FIG. 12 is a flowchart illustrating an operational process for setting a scene when the remote controller is in a scene mode of operation in accordance with embodiments of the present invention.

FIG. 12 is a flowchart illustrating an operational process for setting a scene when the remote controller is in a scene mode of operation (step 308, FIG. 6) in accordance with embodiments of the present invention. A scene is, for example, two or three nodes grouped together as one, at a specific function setting. When the scene is invoked, all nodes in that scene are set to a specific setting. For example, if nodes one (1) and four (4) are part of a group, and node one (1) is programmed by the scene to be turned on and node four (4) is programmed to be off, then, when the scene is invoked, node one (1) is on and node (4) is off. The nodes can not change function. All other nodes (i.e., nodes two (2) and (3) are ignored.

Each group has individual scene keys associated therewith. In accordance with preferred embodiments of the present invention, the left arrow key 34, up arrow key 30, right arrow key 36 and down arrow key 32 are used to create a scene function for Group I, Group II, Group III and Group IV, respectively. The YELLOW key 38 is used to set a scene for Group I; the BLUE key 40 is used to set a scene for Group II; the RED key 42 is used to set a scene for Group III; and the GREEN key 44 is used to set a scene for Group IV. The scene functions for the various groups can be set as described below.

First, the user presses a scene key 30, 32, 34, 36 and the group key 38, 40, 42, 44 associated with the scene key together for at least three seconds (step 1000, also corresponds to YES, step 308 in FIG. 6) to enter a scene programming mode. For example, to program a scene for Group I, a user presses and holds the YELLOW key 38 and the left arrow key 34 for three seconds. To program a scene for Group II, the user presses and holds the BLUE key 40 and the up arrow key 30 together for three seconds. To program a scene for Group III, the user presses and holds the RED key 42 and the right arrow key 36 together for three seconds. To program a scene for Group IV, a user presses and holds the GREEN key 44 and the down arrow key 32 together for three seconds. Scene keys must be programmed in the following order: RED key 42, GREEN key 44, YELLOW key 38 and BLUE key 40.

Next, it is determined whether the scene mode has been successfully entered (step 1002). For example, if an incorrect combination of keys is pressed, such as the RED key 42 and the left arrow key 34, or any other invalid combination of keys is pressed, then the scene mode will not be successfully entered (NO, step 1002), and all LEDs 12*a*-12*d* will blink four times indicating the error (step 1006). If the scene mode is successfully entered (YES, step 1002), then all LEDs 12*a*-12*d* are switched on (step 1004) in response to successfully entering the scene mode.

After successfully entering the scene mode, the user enters a node number for which the user desires to set a scene condition (step 1008). If the entered node number is not a valid node number (NO, step 1010), then all LEDs 12*a*-12*d* will blink four times indicating the error (step 1006). For example, if the entered node number is not in the selected group, then the node number is not considered a valid node number. For example: to set the scene function for node #7, the user presses and releases digit key "0" and then presses and releases digit key "7". If the node number entered in step 1008 is not in the selected group (i.e., if node "07" is in a different group), then all LEDs 12*a*-12*d* will blink four times indicating the error (step 1006). If the node number entered in step 1008 is a valid node number within the selected group (YES, step 1010), then the AUX LED 12*a* will blink three times indicating successful selection of the node (step 1012).

Next, a command to be sent to the node selected in step 1008 is entered by pressing a desired functional key (step 1014). For example, to send a command to switch ON the node selected in step 1008, the CH+ key 50 is pressed. To send a command to set different brightness for the selected node, the VOL+ key 46 or the VOL− key 48 may be pressed. After the command is entered, the ENTER key 60 is pressed to confirm the setting (step 1016). If the user does not press the ENTER key 60 within a predetermined time period (NO, step 1016), for example ten seconds, then the setting will not be saved, and the remote controller 2 exits from the scene programming mode. If the ENTER key 60 is successfully pressed (YES, step 1016), then the AUX LED 12*a* will then blink three times indicating successful setting of the function for the node (step 1018).

Continuing, it is determined whether additional scenes for remaining nodes in the group are to be set (step 1020). If additional scenes are to be set (YES, step 1020), then steps 1008 through 1018 are repeated to set up different scenes for the remaining nodes in the group. If all the settings are completed (NO, step 1020), then the respective scene key is pressed and released (step 1022). The AUX LED 12*a* will blink three times indicating the successful completion of scene programming (step 1024).

To exit from the scene programming mode, a user can press the respective scene key during any of above steps 1008 though 1018. Scene programming will exit. If the scene programming is exited after setting the function for one node as in steps 1008-10180, the remote controller 2 will save that setting and exit from the scene programming mode. After exit from the scene programming mode, the AUX LED 12*a* will blink three times indicating successful exit from the scene programming mode. The user can change the previous settings of a node by repeating steps 1008 to 1018.

To turn off a scene, the scene mode is entered a second time by pressing the scene key and corresponding group key as described above with respect to step 1000.

In accordance with preferred embodiments of the present invention, after entering into a scene mode, if no action is performed within ten seconds, scene programming will exit without saving the current settings. Only completed settings will be stored. For example, if the user completes the settings for node "07" within Group I, the AUX LED 12*a* will blink three times indicating successful setting. At this point, if the user does not press any key for ten seconds, the universal remote controller 2 will save the setting for node #7 in Group I and exit from scene programming. By default, all the nodes in group are set as OFF in scene function. In above steps, if there is an error, all LED's 12*a*-12*d* will blink four times indicating an error.

To delete the scene settings, the group key and scene key are selected and pressed, as described above with respect to step 1000, to enter the scene mode. After entering into scene mode, the LIST key 56 is pressed and released. All the scene settings within the relevant group will be deleted and the scene will be set to the default setting (all nodes OFF). After successful deletion of the scene setting, the AUX LED 12*a* will blink three times indicating successful deletion of the scene settings.

The number of scenes that can be set is dependent only on the number of group keys in the remote controller 2. For example, if there are only three group keys in the remote controller 2, then the user can set scenes for only these available three groups.

Performing a Scene Function

To perform a scene function, the scene key associated with a respective group (arrow up key 30, arrow down key 32, arrow left key 34 or arrow right key 36) is pressed and released. The remote controller 2 will send the programmed scene command to the selected group nodes. To switch off the scene, the respective scene key 30, 32, 34, 36 is pressed and released again. On successful transmission of the command to control the scene, the AUX LED 12*a* will blink three times.

IR-Home Automation Handshake

Figure 13A:
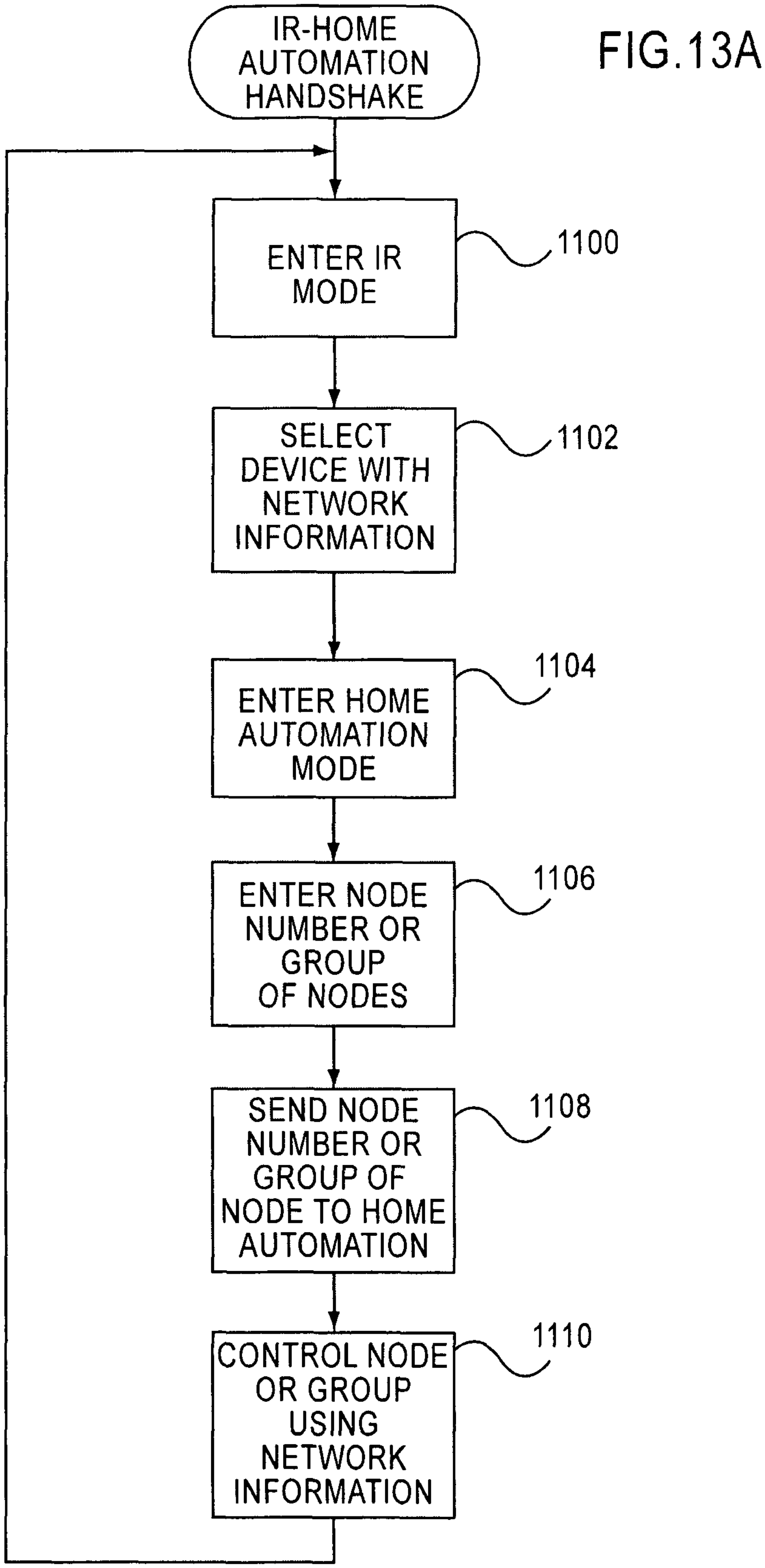
FIGS. 13A and 13B are flowcharts illustrating an IR-home automation handshake process to control the exchange of information between the control unit 4 and the home automation module 14.
Figure 13B:
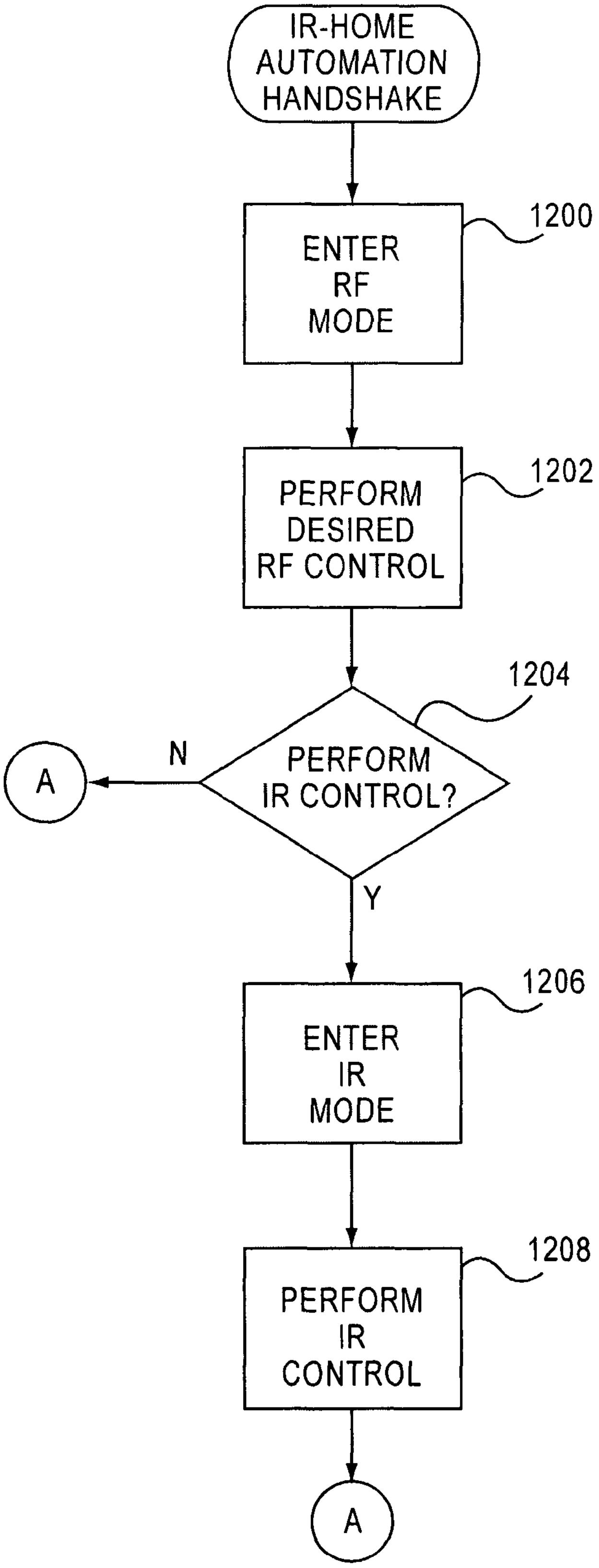

FIGS. 13A and 13B are flowcharts illustrating an IR-home automation handshake process to control the exchange of information between the control unit 4 and the home automation module 14. In particular, FIG. 13A illustrates an operational process for controlling a mode of operation wherein IR control information may be sent from the control unit 4 to the home automation module 14 to control RF functions. FIG. 13B illustrates an operational process for controlling a mode of operation wherein RF control information may be sent from the home automation module 14 to the control unit 4 to ultimately control IR functions. The IR-home automation handshake process is controlled by the IR-home-automation handshake firmware module 4*c*.

As shown in FIG. 13A, in the IR-home-automation handshake process wherein IR control information is sent from the control unit 4 to the home automation module 14, first, the IR mode is entered by pressing the AUX key 22 (step 1100), as described above with reference to FIG. 5. Next, a device that has network information, such as Z-WAVE information, relevant to a desired control operation to be performed in the home automation mode is selected by pressing a device key, such as the TV key 24, DVD/VCR key 26 or CBL key 28 (step 1102). For example, the device that is selected may be the TV and the relevant network information that the TV has may be temperature information provided by the TV. After the network information (e.g., Z-WAVE information) is obtained in the IR mode, the home automation mode is entered (step 1104). The home automation mode may be manually entered by toggling the AUX key 22, as described with reference to FIG. 5. Alternatively, the home automation mode may be automatically entered by automatically generating a signal to change the mode. Upon entering the home automation mode, the node number of a node or a group of nodes to be controlled using the network information may be entered and stored in EEPROM of memory 8 (step 1106). The node or group of nodes to be controlled is then sent to the home automation module 14 via the RS232C interface (step 1108), and the network information obtained in the IR mode may be used to control the node or group of nodes in the home automation network using RF commands (step 1110). In the embodiment described above with reference to FIG. 13A, the control of information exchange between the control unit 4 and the home automation module 14 may be performed either manually or automatically. For example, the control unit 4 may be programmed to recognize a command to turn on the TV in the IR mode and, in response to the command to turn on the TV in the IR mode, to automatically generate and send a command to the home automation module 14 via the RS232C interface to cause the home automation module 14 to lower the blinds when the TV is on. Conversely, the home automation module 14 may automatically send information to the control unit 4 to prevent the TV from being turned on when the blinds are up.

Another example of IR-home automation handshake relates to adding and deleting nodes in a home automation network. The home automation network includes a controller and several nodes. The controller coordinates all of the information flowing between the nodes. The nodes perform functions, such as turning on lights, dimming lights, opening and closing blinds, etc. The operation of forming a network includes adding and deleting nodes. In the case of the Z WAVE network, adding and deleting of nodes is typically performed by pressing a button of the node and a key of the controller. Adding and deleting nodes can be a very time consuming function. If the system also accepts IR data, then it is possible to add and delete nodes using the IR function. As a result, the user of the home automation network can save time by adding and deleting nodes using IR.

As shown in FIG. 13B, in the IR-home-automation handshake process wherein RF control information is sent from the home automation module 14 to the control unit 4, first, the home automation mode (RF mode) is entered by pressing the AUX key 22 (step 1200), as described above with reference to FIG. 5. Next, a desired control operation is performed in the home automation mode by pressing a specific key or keys on the remote controller 2 (step 1202). For example, the control operation may be an operation to close a window or a blind in the home automation mode (RF mode). When the desired control operation in the home automation mode is performed, the remote controller 2 then determines if an associated operation in the IR mode is to be performed (step 1204). For example, after the command to close the window or the blind in the home automation mode has been entered, the remote controller 2 would then check its internal clock to determine if this command has been entered during peak hours (e.g., during rush hour when streets are noisy). If the command to close the window or the blind has been entered during peak hours, then the remote controller 2 would determine that an associated operation in the IR mode, such as lowering the volume of a specified audio system or TV, is to be performed (YES, step 1204). The specified audio system or TV, and the audio status (i.e., volume) at which the specified device is to be set can be stored in the EEPROM of the memory 8. The time of day would also be stored in EEPROM of the memory 8. Next, the remote controller 2 is switched to the IR mode (step 1206), either by toggling the AUX key 22 or automatically by generating a command. After the remote controller enters the IR mode, the control unit 4 then controls turning down the volume of the TV or the audio system based on information stored in the EEPROM (step 1208). After step 1208 or after a negative decision in step 1204, the operational process returns to (A) in FIG. 6.

An additional example of the IR-home automation handshaking procedure wherein RF control information is sent from the home automation module 14 to the control unit 4, is provided below. For example, a garage door may be closed using the RF mode of operation. Once the garage door is closed, an alarm is turned off via the IR mode of operation. The reason for using the RF mode is that RF has a longer range than IR and can penetrate walls. The IR mode is used for security reasons. As described above, the remote controller 2 operates in two modes: RF channel mode or IR channel mode. The RF mode has a much larger range. However, this makes it easy to intercept the signal. The IR mode can only operate in the same room. Therefore, the only way to intercept the signal is to have access to the room.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention, which is to be determined by the following claims.

What is claimed is:

1. A universal remote controller for generating an RF control signal for controlling a radio frequency based home automation network and for generating an IR control signal for controlling an infrared based electronic device, comprising:

an IR signal generator which generates an infrared signal that is the IR control signal;

an RF signal generator which generates a radio frequency signal that is the RF control signal;

a user input interface including a first input mechanism and a second input mechanism, wherein the first input mechanism generates control information in response to an operation of the first input mechanism and the second input mechanism generates, in response to operation of the second input mechanism, a command to switch an operational mode of the universal remote controller between an IR control mode of operation in which operation of the first input mechanism causes only the IR signal generator to generate the IR control signal to control an electronic device, and an RF control mode of operation in which operation of the first input mechanism causes only the RF signal generator to generate the RF control signal to control a radio frequency based home automation network;

a control unit connected to the IR signal generator, the RF signal generator and the user input interface, wherein the control unit receives the control information generated in response to the operation of the first input mechanism and the command generated in response to the operation of the second input mechanism, and generates an IR command that is sent to the IR signal generator causing the IR signal generator to generate the IR control signal based on the received control information in response to the command to switch the operational mode of the universal remote controller switching the universal remote controller to the IR control mode, and wherein the control unit translates the control information generated in response to the operation of the first input mechanism to an RF command causing the RF signal generator to generate the RF control signal in response to the command to switch the operational mode of the universal remote controller switching the universal remote controller to the RF control mode;

a home automation module connected to the control unit via a communication interface, the home automation module receiving the RF command causing the RF signal generator to generate the RF control signal from the control unit via the communication interface in response to the universal remote controller being in the RF control mode, and generating a command producing the RF control signal;

wherein the home automation module comprising an application specific integrated circuit, a transceiver and a memory;

wherein the home automation module receives the control information generated in response to the operation of the first input mechanism while in the RF control mode and automatically generates and sends a command, via the communication interface, to the control unit to switch to the IR control mode, and produce IR control signals related to the control information input in the RF control mode.

2. The universal remote controller as recited in claim 1, further comprising a display to display feedback information to a user regarding a control operation entered via the user interface for controlling the home automation network, wherein the display is an LED display, and the display displays an indication of successful execution of the control operation by blinking the LED a predetermined number of times.

3. The universal remote controller as recited in claim 2, wherein the control operation in response to which the LED blinks the predetermined number of times to indicate successful execution of the control operation includes at least one of changing an operation mode of the universal remote controller between the IR control mode and the RF control mode, adding a node device to or deleting a node device from the home automation network, setting a node device of the home automation network on or off, setting an attenuation level of a node device of the home automation network, programming a group node function, and programming a scene function.

4. The universal remote controller as recited in claim 2, wherein the display is an LED display including a plurality of LEDs, and the display displays an indication that the control operation is being executed by switching on the plurality of LEDs.

5. The universal remote controller as recited in claim 4, wherein the control operation in response to which the plurality of LEDs are switched on to indicate execution of the control operation includes at least one of changing an operation mode of the universal remote controller between the IR control mode and the RF control mode, adding a node device to or deleting a node device from the home automation network, setting a node device of the home automation network on or off, setting an attenuation level of a node device of the home automation network, programming a group node function, and programming a scene function.

6. The universal remote controller as recited in claim 2, wherein the display is an LED display including a plurality of LEDs, and the display displays an indication of failure of the control operation by causing the plurality of LEDs to blink a predetermined number of times.

7. The universal remote controller as recited in claim 6, wherein the control operation in response to which the plurality of LEDs are caused to blink a predetermined number of times to indicate failure of the control operation includes at least one of changing an operation mode of the universal remote controller between the IR control mode and the RF control mode, adding a node device to or deleting a node device from the home automation network, setting a node device of the home automation network on or off, setting an attenuation level of a node device of the home automation network, programming a group node function, and programming a scene function.

8. The universal remote controller as recited in claim 2, wherein the user input interface includes keys to input the control information, and the display is an LED display including a plurality of LEDs located behind respective keys of the user input interface such that the LEDs are visible through the respective keys.

9. The universal remote controller as recited in claim 2, wherein the display is an LED display including a plurality of LEDs that are selectively actuated in response to execution of the control operation, success of the control operation, and failure of the control operation.

10. The universal remote controller as recited in claim 9, wherein the plurality of LEDs are all turned on during execution of the control operation.

11. The universal remote controller as recited in claim 9, wherein one of the plurality of LEDs is caused to blink a predetermined number of times in response to success of the control operation.

12. The universal remote controller as recited in claim 9, wherein the plurality of LEDs are caused to blink a predetermined number in response to failure of the control operation.

13. The universal remote controller as recited in claim 1, wherein the control unit receives the control information generated in response to the operation of the first input mechanism while in the IR control mode and automatically switches to the RF control mode, and generates and sends a command, via the communication interface, to the home automation module to produce RF control signals related to the control information generated while in the IR control mode.

14. The universal remote controller as recited in claim 1, wherein the user input interface is a keyboard including a key to issue a command to switch the operational mode of the universal remote controller between the IR control mode of operation in which operation of the user input interface causes the IR signal generator to generate the IR control signal and the RF control mode of operation in which operation of the user input interface causes the RF signal generator to generate the RF control signal in response to operation of the key.

15. The universal remote controller as recited in claim 14, wherein a default operational mode of the universal remote controller is the IR control mode of operation in which operation of the user input interface causes the IR signal generator to generate the IR control signal to control an electronic device, and, in response to pressing the key to switch the operational mode of the universal remote controller, the universal remote controller is switched to the RF control mode of operation in which operation of the user input interface causes the RF signal generator to generate the RF control signal to control the radio frequency based home automation network.

* * * * *